(12) United States Patent
Huang

(10) Patent No.: US 10,899,224 B2
(45) Date of Patent: *Jan. 26, 2021

(54) HUB MOTOR ARRANGEMENT OR VEHICLE WITH HUB MOTOR ARRANGEMENT

(71) Applicant: RAZOR USA LLC, Cerritos, CA (US)

(72) Inventor: Joey Chih-Wei Huang, Temple City, CA (US)

(73) Assignee: RAZOR USA LLC, Cerritos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,209

(22) Filed: Mar. 6, 2019

(65) Prior Publication Data
US 2019/0366839 A1 Dec. 5, 2019

Related U.S. Application Data

(60) Continuation of application No. 15/498,322, filed on Apr. 26, 2017, now Pat. No. 10,226,997, which is a
(Continued)

(51) Int. Cl.
*F16H 1/36* (2006.01)
*B60K 17/04* (2006.01)
(Continued)

(52) U.S. Cl.
CPC .............. *B60K 17/046* (2013.01); *B60B 9/26* (2013.01); *B60K 7/0007* (2013.01);
(Continued)

(58) Field of Classification Search
None
See application file for complete search history.

(56) References Cited

U.S. PATENT DOCUMENTS 3,704,759 A 12/1972 Vitkov et al.
3,770,075 A * 11/1973 Vegners ............... B60K 7/0015
180/308

(Continued)

FOREIGN PATENT DOCUMENTS

AU 416302 B2 8/1971
CN 2314959 Y 4/1999
(Continued)

OTHER PUBLICATIONS

Chinese Journal: Planetary gear transmission design, published Sep. 30, 2003, in 9 pages.
(Continued)

*Primary Examiner* — Dirk Wright
(74) *Attorney, Agent, or Firm* — Knobbe, Martens, Olson & Bear LLP

(57) ABSTRACT

A ride-on vehicle, such as for a child, includes a vehicle body and one or more wheels that support the vehicle body relative to a surface. At least one of the wheels includes a hub motor arrangement that provides a drive torque for propelling the vehicle. The hub motor arrangement includes a housing defining an interior space. An axle or other mounting element(s) define an axis of rotation of the housing. Preferably, the axle or other mounting element(s) do not pass completely through the housing. A motor drives the housing through a transmission. Preferably, the motor is a standard, compact motor that is positioned on the axis of rotation and can be laterally offset from a central plane of the housing. In some embodiments, a traction element is carried directly by the housing.

25 Claims, 24 Drawing Sheets

Related U.S. Application Data division of application No. 14/709,916, filed on May 12, 2015, now Pat. No. 9,638,285, which is a continuation-in-part of application No. 14/318,387, filed on Jun. 27, 2014, now Pat. No. 9,660,500.

(60) Provisional application No. 61/974,962, filed on Apr. 3, 2014, provisional application No. 61/904,253, filed on Nov. 14, 2013.

(51) Int. Cl.

| | |
|---|---|
| F16H 1/46 | (2006.01) |
| B60K 7/00 | (2006.01) |
| B62K 3/00 | (2006.01) |
| B62K 9/00 | (2006.01) |
| H02K 7/116 | (2006.01) |
| B62M 11/16 | (2006.01) |
| B60B 9/26 | (2006.01) |
| B60L 50/60 | (2019.01) |
| B60K 17/14 | (2006.01) |
| B62M 6/40 | (2010.01) |
| B62M 11/02 | (2006.01) |
| F16H 1/28 | (2006.01) |
| H02K 7/08 | (2006.01) |
| F16H 57/02 | (2012.01) |

(52) U.S. Cl.
CPC ......... *B60K 17/145* (2013.01); *B60L 50/60* (2019.02); *B62K 3/002* (2013.01); *B62K 9/00* (2013.01); *B62M 6/40* (2013.01); *B62M 11/02* (2013.01); *B62M 11/16* (2013.01); *F16H 1/28* (2013.01); *F16H 1/36* (2013.01); *F16H 1/46* (2013.01); *H02K 7/08* (2013.01); *H02K 7/116* (2013.01); *B60K 2007/0038* (2013.01); *B60K 2007/0092* (2013.01); *B60Y 2200/126* (2013.01); *B60Y 2200/13* (2013.01); *B60Y 2200/81* (2013.01); *B62K 2202/00* (2013.01); *F16H 2001/2872* (2013.01); *F16H 2057/02034* (2013.01)

(56) References Cited

U.S. PATENT DOCUMENTS

| | | | | |
|---|---|---|---|---|
| 4,424,879 A * | 1/1984 | Sonzogni | ............ | B60K 17/046 180/255 |
| 4,617,839 A * | 10/1986 | Matoba | ............ | F16H 1/28 475/335 |
| 5,616,097 A * | 4/1997 | Dammon | ............ | F16H 1/46 180/374 |
| 5,928,099 A * | 7/1999 | Tsunemi | ............ | B60K 7/0015 180/9.62 |
| 6,367,571 B1 * | 4/2002 | Schwarz | ............ | B60K 7/0007 180/252 |
| 6,458,057 B2 * | 10/2002 | Massaccesi | ............ | B60K 17/046 180/372 |
| 6,524,206 B2 * | 2/2003 | Tsunemi | ............ | B60K 7/0015 475/83 |
| 6,702,070 B2 * | 3/2004 | Smith | ............ | B60K 7/0015 188/250 G |
| 6,712,727 B2 | 3/2004 | Kujira et al. | | |
| 6,931,959 B2 * | 8/2005 | Giuriati | ............ | F16H 57/082 475/331 |
| 7,249,643 B2 * | 7/2007 | Etzioni | ............ | B62M 6/65 180/65.51 |
| 7,375,450 B2 * | 5/2008 | Tanaka | ............ | B62J 6/12 310/216.004 |
| 8,323,143 B2 * | 12/2012 | Schoon | ............ | B60K 17/046 475/337 |
| 8,419,581 B2 * | 4/2013 | Lo | ............ | B60K 1/04 180/65.51 |
| 8,449,424 B2 * | 5/2013 | Schoon | ............ | B60K 17/046 475/153 |
| 8,628,449 B1 * | 1/2014 | Burgman | ............ | F16H 57/082 475/331 |
| 8,662,277 B2 * | 3/2014 | Schoon | ............ | B60T 1/062 188/71.5 |
| 8,674,573 B2 * | 3/2014 | Adachi | ............ | B62M 6/65 310/89 |
| 8,702,549 B2 | 4/2014 | Yoshino et al. | | |
| 8,783,393 B2 * | 7/2014 | Besler | ............ | B60B 35/16 180/60 |
| 9,017,206 B2 * | 4/2015 | Nakamura | ............ | F16H 1/32 475/162 |
| 9,046,154 B2 * | 6/2015 | Ishizuka | ............ | B60K 17/046 |
| 9,103,380 B2 * | 8/2015 | Hirano | ............ | B60K 7/0007 |
| 9,303,727 B2 * | 4/2016 | Reimann | ............ | F16H 1/28 |
| 9,308,965 B2 * | 4/2016 | Folmli | ............ | B62M 6/65 |
| 9,638,285 B2 | 5/2017 | Huang | | |
| 9,660,500 B2 | 5/2017 | Huang | | |
| 9,950,562 B2 * | 4/2018 | Forrest | ............ | F16H 1/46 |
| 10,226,997 B2 | 3/2019 | Huang | | |
| 10,432,064 B2 | 10/2019 | Huang | | |
| 10,479,190 B2 * | 11/2019 | Li | ............ | B60K 7/0007 |
| 2004/0012246 A1 | 1/2004 | Rhyne et al. | | |
| 2005/0176542 A1 | 8/2005 | Lo | | |
| 2005/0264112 A1 * | 12/2005 | Tanaka | ............ | B62M 6/65 310/75 C |
| 2009/0032321 A1 | 2/2009 | Marsh et al. | | |
| 2010/0304918 A1 * | 12/2010 | Burgman | ............ | F16H 63/3425 475/331 |
| 2012/0083375 A1 | 4/2012 | Lo | | |
| 2012/0083376 A1 | 4/2012 | Lo | | |
| 2012/0309578 A1 * | 12/2012 | Solka | ............ | F16H 37/041 475/149 |
| 2013/0012350 A1 * | 1/2013 | Ebner | ............ | B60K 17/046 475/149 |
| 2013/0109526 A1 | 5/2013 | Oishi | | |
| 2013/0192400 A1 | 8/2013 | Dodo et al. | | |
| 2013/0284527 A1 | 10/2013 | Murakami et al. | | |
| 2014/0135166 A1 | 5/2014 | Wang et al. | | |
| 2015/0133253 A1 * | 5/2015 | Huang | ............ | B60K 17/046 475/149 |
| 2015/0239527 A1 | 8/2015 | Huang | | |
| 2017/0257004 A1 | 9/2017 | Huang | | |
| 2020/0195090 A1 | 6/2020 | Huang | | |

FOREIGN PATENT DOCUMENTS

| | | |
|---|---|---|
| CN | 1702015 A | 11/2005 |
| CN | 20292823 U | 5/2013 |
| DE | 2051686 A1 | 4/1971 |
| DE | 10103726 A1 | 8/2002 |
| EP | 1601085 | 11/2005 |
| EP | 2586694 | 5/2013 |
| TW | M390917 U1 | 10/2010 |
| WO | WO 2016/183095 A1 | 11/2016 |

OTHER PUBLICATIONS

European Extended Search Report in European Application No. 16793376.1, dated Feb. 12, 2019, in 9 pages.
International Preliminary Report on Patentability in International Patent Application No. PCT/US2014/065476, dated May 26, 2016, in 15 pages.
International Search Report and Written Opinion in corresponding International Patent Application No. PCT/US2016/031664, dated Aug. 8, 2016, in 10 pages.
International Preliminary Report on Patentability in corresponding International Patent Application No. PCT/US2016/031664, dated Nov. 23, 2017, in 9 pages.
Invalidation Declaration Request filed against Chinese Utility Model No. CN 204334222U, received on Apr. 26, 2019, in 48 pages.
PCT Search Report and Written Opinion for PCT/US2014/065476 dated Mar. 18, 2015.
Decision of Patent Re-examination Board regarding Invalidation Declaration Request filed against Chinese Utility Model No. CN 204334222U, dated Nov. 5, 2019, in 62 pages.

(56) References Cited

OTHER PUBLICATIONS

Petition to Appeal Decision of Patent Re-examination Board regarding Invalidation Declaration Request filed against Chinese Utility Model No. CN 204334222U, dated Feb. 4, 2020, in 11 pages.

* cited by examiner

HUB MOTOR ARRANGEMENT OR VEHICLE WITH HUB MOTOR ARRANGEMENT

INCORPORATION BY REFERENCE TO RELATED APPLICATIONS

The present application is a continuation of U.S. patent application Ser. No. 15/498,322, filed Apr. 26, 2017, which is a division of U.S. patent application Ser. No. 14/709,916, filed May 12, 2015, which is a continuation-in-part of U.S. patent application Ser. No. 14/318,387, filed Jun. 27, 2014, which claims the benefit of priority to U.S. Provisional Application No. 61/974,962, filed Apr. 3, 2014 and U.S. Provisional Application No. 61/904,253, filed Nov. 14, 2013, the entirety of each of which is hereby incorporated by reference herein.

BACKGROUND

Field

The present invention relates generally to hub motor arrangements and vehicles incorporating hub motor arrangements.

Description of the Related Art

Hub motor arrangements have been utilized to propel certain types of vehicles, such as electric bicycles, for example. Such hub motors often incorporate custom and/or large electric motor arrangements, which results in the hub motor arrangement being heavy and/or expensive. Powered children's vehicles often utilize an electric motor to power one or more wheels of the vehicle. Providing the vehicle with a desirable operating experience at a reasonably low cost is often a design objective for children's vehicles and other vehicles. While incorporating a hub motor arrangement would provide advantages in some respects, existing hub motor arrangements generally are too expensive and/or heavy for use in children's vehicles.

SUMMARY

Thus, a need exists for improved hub motor arrangements that can be incorporated in children's vehicles, or other smaller, light weight vehicles, and provide desirable performance at a reasonable cost. Some such hub motor arrangements utilize a standard "off-the-shelf" motor and/or a traction element that is directly carried by a housing of the hub motor arrangement.

The systems, methods and devices described herein have innovative aspects, no single one of which is indispensable or solely responsible for their desirable attributes. Without limiting the scope of the claims, some of the advantageous features will now be summarized.

An embodiment involves a ride-on vehicle, such as for a child, which includes a vehicle body and one or more wheels that support the vehicle body relative to a surface. At least one of the wheels includes a hub motor arrangement that provides a drive torque for propelling the vehicle. The hub motor arrangement includes a housing defining an interior space and an axis of rotation. A first lateral support member is supported by the axle and positioned at least partially within the interior space of the housing. A second lateral support member is positioned at least partially within the interior space of the housing and spaced from the first lateral support member along the axis of rotation. A plurality of connecting shafts extend between the first lateral support member and the second lateral support member. A plurality of planet gears, each of which is supported on a respective one of the plurality of connecting shafts. A sun gear is driven by a motor and drives the plurality of planet gears. A ring gear is driven by the plurality of planet gears. The ring gear drives the housing for rotation about the axis of rotation.

In some configurations, an axle defines an axis of rotation of the housing. A first end portion of the axle can be located outside of the interior space of the housing and a second end portion of the axle can be located within the interior space of the housing such that the axle does not pass completely through the housing.

In some configurations, the motor has a first end portion located outside of the interior space of the housing and a second end portion located within the interior space of the housing.

In some configurations, a number of the plurality of planet gears equals a number of the plurality of connecting shafts. However, in other configurations, the number of connecting shafts can be greater than the number of planet gears. For example, some connecting shafts can be provided solely or primarily for structural reasons relating to lateral support of the housing and such shafts may not carry a planet gear.

In some configurations, the housing is supported for rotation relative to the first lateral support member and the second lateral support member by a first bearing and a second bearing, respectively. The second bearing can surround the motor.

In some configurations, the second lateral support member defines a pocket and the motor is positioned within the pocket. The first lateral support member can define a space and the second end portion of the axle can be positioned within the space.

In some configurations, the plurality of planet gears are positioned between the axle and the motor along the axis of rotation.

In some configurations, the ring gear is a separate component from the housing. One of the ring gear and the housing can define a plurality of protrusions and the other of the ring gear and the housing can define a plurality of recesses that receive the protrusions to drivingly engage the ring gear and the housing.

In some configurations, the plurality of planet gears is three planet gears. The plurality of connecting shafts can be three connecting shafts.

In some configurations, each of the plurality of connecting shafts overlaps both the axle and the motor along the axis of rotation.

In some configurations, the hub motor arrangement includes a traction element that contacts the surface on which the vehicle is operated, wherein the traction element is carried directly by the housing.

In some configurations, the housing defines a central plane that is perpendicular to the axis of rotation and the motor is offset from the central plane along the axis of rotation.

An embodiment involves a ride-on vehicle, such as for a child, having a vehicle body with one or more wheels that support the vehicle body relative to a surface. At least one of the wheels includes a hub motor arrangement that provides a drive torque for propelling the vehicle. The hub motor arrangement includes a housing defining an interior space and an axis of rotation. The hub motor arrangement includes a first plurality of planet gears, each of which are supported on a first planet carrier. The first planet carrier includes a carrier sun gear. The hub motor arrangement includes a second plurality of planet gears, each of which are supported on a second planet carrier and driven by the carrier sun gear. A sun gear is driven by a motor and the sun gear drives the first plurality of planet gears. A ring gear is driven by the first plurality of planet gears and the second plurality of planet gears. The ring gear drives the housing for rotation about the axis of rotation. The motor is coupled for rotation with the ring gear and the housing.

In some configurations, the axle defines an axis of rotation of the housing. A first end portion of the axle can be located outside of the interior space of the housing and a second end portion of the axle can be located within the interior space of the housing such that the axle does not pass completely through the housing.

In some configurations, the housing is supported for rotation relative to the axle by a first bearing. The first bearing can support a first side of the housing and a second end of the housing can be supported by a second bearing at a location spaced from the first bearing along the axis of rotation. The second bearing can surround a portion of the housing.

In some configurations, the first plurality of planet gears and the second plurality of planet gears are positioned between the axle and the motor along the axis of rotation.

In some configurations, the ring gear is a separate component from the housing.

In some configurations, a traction element contacts the surface on which the vehicle is operated and the traction element is carried directly by the housing.

In some configurations, the housing defines a central plane that is perpendicular to the axis of rotation and the motor is offset from the central plane along the axis of rotation.

In some configurations, the first planet carrier and the axle are formed as a single piece.

In some configurations, the housing has a housing sidewall portion extending perpendicular to the axis of rotation and the ring gear has a ring gear sidewall portion. The motor can be positioned within a space defined between the housing sidewall portion and the ring gear side wall portion. The ring gear sidewall portion can be positioned substantially in alignment with a central plane that is perpendicular to the axis of rotation.

An embodiment involves a hub motor arrangement including a housing portion defining an interior space and an axis of rotation. A first lateral support member and a second lateral support member are spaced from one another along the axis of rotation. A plurality of connecting shafts extend between the first lateral support member and the second lateral support member. Each of a plurality of planet gears is supported on a respective one of the plurality of connecting shafts. A motor occupies a portion of the axis of rotation. A sun gear is driven by the motor and drives the plurality of planet gears. A ring gear is driven by the plurality of planet gears and drives the housing portion for rotation about the axis of rotation.

In some configurations, the housing portion is supported for rotation relative to the plurality of connecting shafts by a plurality of bearings, each supported by a respective one of the plurality of connecting shafts. The number of the connecting shafts can equal the number of the bearings.

In some configurations, the number of the planet gears is less than the number of the connecting shafts. The number of planet gears can be equal to one-half the number of connecting shafts.

In some configurations, the first lateral support member defines a pocket and the motor is positioned within the pocket.

In some configurations, the ring gear is integrated with the housing portion.

In some configurations, a traction element contacts the surface on which the vehicle is operated, wherein the traction element is carried directly by the housing portion.

In some configurations, the housing portion defines a central plane that is perpendicular to the axis of rotation, wherein the motor is offset from the central plane along the axis of rotation.

In some configurations, the first lateral support member defines at least one recess positioned adjacent the motor, wherein the at least one recess includes an opening passing through the first lateral support member to provide access to the motor.

In some configurations, each of the first lateral support member and the second lateral support member defines a mounting portion for mounting the hub motor arrangement to an associated vehicle, wherein the first and second lateral support members are stationary with respect to the associated vehicle and the housing portion rotates relative to the first and second lateral support members.

An embodiment involves a hub motor arrangement including a housing defining an interior space and an axis of rotation. A first lateral support member is supported by the axle and positioned at least partially within the interior space of the housing. A second lateral support member is positioned at least partially within the interior space of the housing and spaced from the first lateral support member along the axis of rotation. A plurality of connecting shafts extend between the first lateral support member and the second lateral support member. The hub motor arrangement includes a plurality of planet gears, each of which is supported on a respective one of the plurality of connecting shafts. A sun gear is driven by a motor and drives the plurality of planet gears. A ring gear is driven by the plurality of planet gears. The ring gear drives the housing for rotation about the axis of rotation.

An embodiment involves a hub motor arrangement that includes a housing defining an interior space and an axis of rotation. The hub motor arrangement includes a first plurality of planet gears, each of which are supported on a first planet carrier. The first planet carrier includes a carrier sun gear. The hub motor arrangement includes a second plurality of planet gears, each of which are supported on a second planet carrier and driven by the carrier sun gear. A sun gear is driven by a motor and the sun gear drives the first plurality of planet gears. A ring gear is driven by the first plurality of planet gears and the second plurality of planet gears. The ring gear drives the housing for rotation about the axis of rotation. The motor is coupled for rotation with the ring gear and the housing.

An embodiment involves a hub motor arrangement that includes a housing defining an interior space and an axis of rotation. The hub motor arrangement includes a first lateral support member positioned at least partially within the interior space of the housing. The hub motor arrangement includes a second lateral support member positioned at least partially within the interior space of the housing and spaced from the first lateral support member along the axis of rotation. The hub motor arrangement includes a plurality of connecting shafts extending between the first lateral support member and the second lateral support member. The hub motor arrangement includes a plurality of planet gears, each planet gear being a double spur gear supported on a respective one of the plurality of connecting shafts. The hub motor arrangement includes a first interconnecting member positioned within the interior space of the housing and a second interconnecting member positioned within the interior space of the housing and configured to engage the first interconnecting member. The hub motor arrangement includes a motor, a sun gear driven by the motor and that drives a first gear portion of each of the plurality of planet gears, and a ring gear driven by a second gear portion of each of the plurality of planet gears, wherein the ring gear drives the housing for rotation about the axis of rotation wherein the planet gears are positioned between the first and second interconnecting members and the first and second interconnecting members engage one another in one or more spaces outside the circumferences of the plurality of planet gears.

In some configurations, the motor has a first end portion located outside of the interior space of the housing and a second end portion located within the interior space of the housing. In some configurations, the housing is supported for rotation relative to the first lateral support member and the second lateral support member by a first bearing and a second bearing, respectively. In some configurations, the second bearing surrounds the motor.

In some configurations, the hub motor arrangement also includes an axle defining the axis of rotation of the housing, wherein a first end portion of the axle is located outside of the interior space of the housing and a second end portion of the axle is located within the interior space of the housing such that the axle does not pass completely through the housing.

In some configurations, the second lateral support member defines a pocket and the motor is positioned within the pocket. In some configurations, the first lateral support member defines a space and the second end portion of the axle is positioned within the space. In some configurations, the plurality of planet gears is positioned between the axle and the motor along the axis of rotation. In some configurations, each of the plurality of connecting shafts overlaps both the axle and the motor along the axis of rotation. In some configurations, the ring gear is a separate component from the housing.

In some configurations, one of the ring gear and the housing defines a plurality of protrusions and the other of the ring gear and the housing defines a plurality of recesses that receive the protrusions to drivingly engage the ring gear and the housing. In some configurations, the plurality of planet gears is three planet gears. In some configurations, the plurality of connecting shafts is three connecting shafts.

In some configurations, the hub motor arrangement further includes a traction element that contacts the surface on which the vehicle is operated, wherein the traction element is carried indirectly by the housing. In some configurations, the hub motor arrangement further includes a radially compliant member positioned between the housing and the traction element, wherein the radially compliant member is configured to transfer rotational force from the housing to the traction element and can compress in a radial direction to absorb impact. In some configurations, the radially compliant member comprises a plurality of generally radially extending elements that can compress or buckle in a radial direction.

In some configurations, the housing defines a central plane that is perpendicular to the axis of rotation, wherein the motor is offset from the central plane along the axis of rotation. In some configurations, a number of the plurality of planet gears equals a number of the plurality of connecting shafts. In some configurations, the plurality of connecting shafts defines a circle having a diameter, and wherein the motor defines an outer peripheral surface that is located within the diameter.

An embodiment involves a hub motor arrangement that includes a housing defining an interior space and an axis of rotation. The hub motor arrangement includes a first interconnecting member positioned within the interior space of the housing. The hub motor arrangement includes a second interconnecting member positioned within the interior space of the housing and configured to engage the first interconnecting member. The hub motor arrangement includes a first plurality of planet gears, each of the first plurality of planet gears supported on a first planet carrier, the first planet carrier comprising a carrier sun gear, a second plurality of planet gears, each of the second plurality of planet gears supported on a second planet carrier and driven by the carrier sun gear, a motor, a sun gear driven by the motor and that drives the first plurality of planet gears, and a ring gear driven by the first plurality of planet gears and the second plurality of planet gears, wherein the ring gear drives the housing for rotation about the axis of rotation, wherein the motor is coupled for rotation with the ring gear and the housing and the plurality of planet gears are between the first and second interconnecting members, and the first and second interconnecting members engage one another in a space outside the outer circumferences of the plurality of planet gears.

In some configurations, the hub motor arrangement further includes an axle defining the axis of rotation of the housing, wherein a first end portion of the axle is located outside of the interior space of the housing and a second end portion of the axle is located within the interior space of the housing such that the axle does not pass completely through the housing. In some configurations, the housing is supported for rotation relative to the axle by a first bearing. In some configurations, the first bearing supports a first side of the housing and a second end of the housing is supported by a second bearing at a location spaced from the first bearing along the axis of rotation. In some configurations, the second bearing surrounds a portion of the housing.

In some configurations, the first plurality of planet gears and the second plurality of planet gears are positioned between the axle and the motor along the axis of rotation. In some configurations, the first planet carrier and the axle are formed as a single piece. In some configurations, the ring gear is a separate component from the housing.

In some configurations, the hub motor arrangement further includes a traction element that contacts the surface on which the vehicle is operated, wherein the traction element is carried indirectly by the housing. In some configurations, the hub motor arrangement further includes a radially compliant member positioned between the housing and the traction element, wherein the radially compliant member is configured to transfer rotational force from the housing to the traction element and can compress in a radial direction to absorb impact. In some configurations, the radially compliant member comprises a plurality of generally radially extending elements that can compress or buckle in a radial direction.

In some configurations, the housing defines a central plane that is perpendicular to the axis of rotation, wherein the motor is offset from the central plane along the axis of rotation. In some configurations, the housing has a housing sidewall portion extending perpendicular to the axis of rotation and the ring gear has a ring gear sidewall portion, wherein the motor is positioned within a space defined between the housing sidewall portion and the ring gear side wall portion. In some configurations, the ring gear sidewall portion is positioned substantially in alignment with a central plane that is perpendicular to the axis of rotation.

An embodiment involves a hub motor arrangement that includes a housing portion defining an interior space and an axis of rotation, a first lateral support member, a second lateral support member spaced from the first lateral support member along the axis of rotation, and a plurality of connecting shafts extending between the first lateral support member and the second lateral support member. The hub motor arrangement includes a plurality of planet gears, each planet gear being a double spur gear supported on a respective one of the plurality of connecting shafts, a motor occupying a portion of the axis of rotation, a sun gear driven by the motor and that drives a first gear portion of each of the plurality of planet gears, and a ring gear driven by a second gear portion of each of the plurality of planet gears, wherein the ring gear drives the housing portion for rotation about the axis of rotation.

In some configurations, the housing portion is supported for rotation relative to the plurality of connecting shafts by a plurality of bearings, each supported by a respective one of the plurality of connecting shafts. In some configurations, the number of the connecting shafts equals the number of the bearings. In some configurations, the number of the planet gears is less than the number of the connecting shafts. In some configurations, the number of planet gears is equal to one-half the number of connecting shafts.

In some configurations, the first lateral support member defines a pocket and the motor is positioned within the pocket. In some configurations, the ring gear is integrated with the housing portion.

In some configurations, the hub motor arrangement further includes a traction element that contacts the surface on which the vehicle is operated, wherein the traction element is carried indirectly by the housing portion. In some configurations, the hub motor arrangement further includes a radially compliant member positioned between the housing and the traction element, wherein the radially compliant member is configured to transfer rotational force from the housing to the traction element and can compress in a radial direction to absorb impact. In some configurations, the radially compliant member comprises a plurality of generally radially extending elements that can compress or buckle in a radial direction.

In some configurations, the housing portion defines a central plane that is perpendicular to the axis of rotation, wherein the motor is offset from the central plane along the axis of rotation. In some configurations, the first lateral support member defines at least one recess positioned adjacent the motor, wherein the at least one recess includes an opening passing through the first lateral support member to provide access to the motor. In some configurations, each of the first lateral support member and the second lateral support member defines a mounting portion for mounting the hub motor arrangement to an associated vehicle, wherein the first and second lateral support members are stationary with respect to the associated vehicle and the housing portion rotates relative to the first and second lateral support members. In some configurations, the plurality of connecting shafts defines a circle having a diameter, and wherein the motor defines an outer peripheral surface that is located within the diameter.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION

Figure 1:
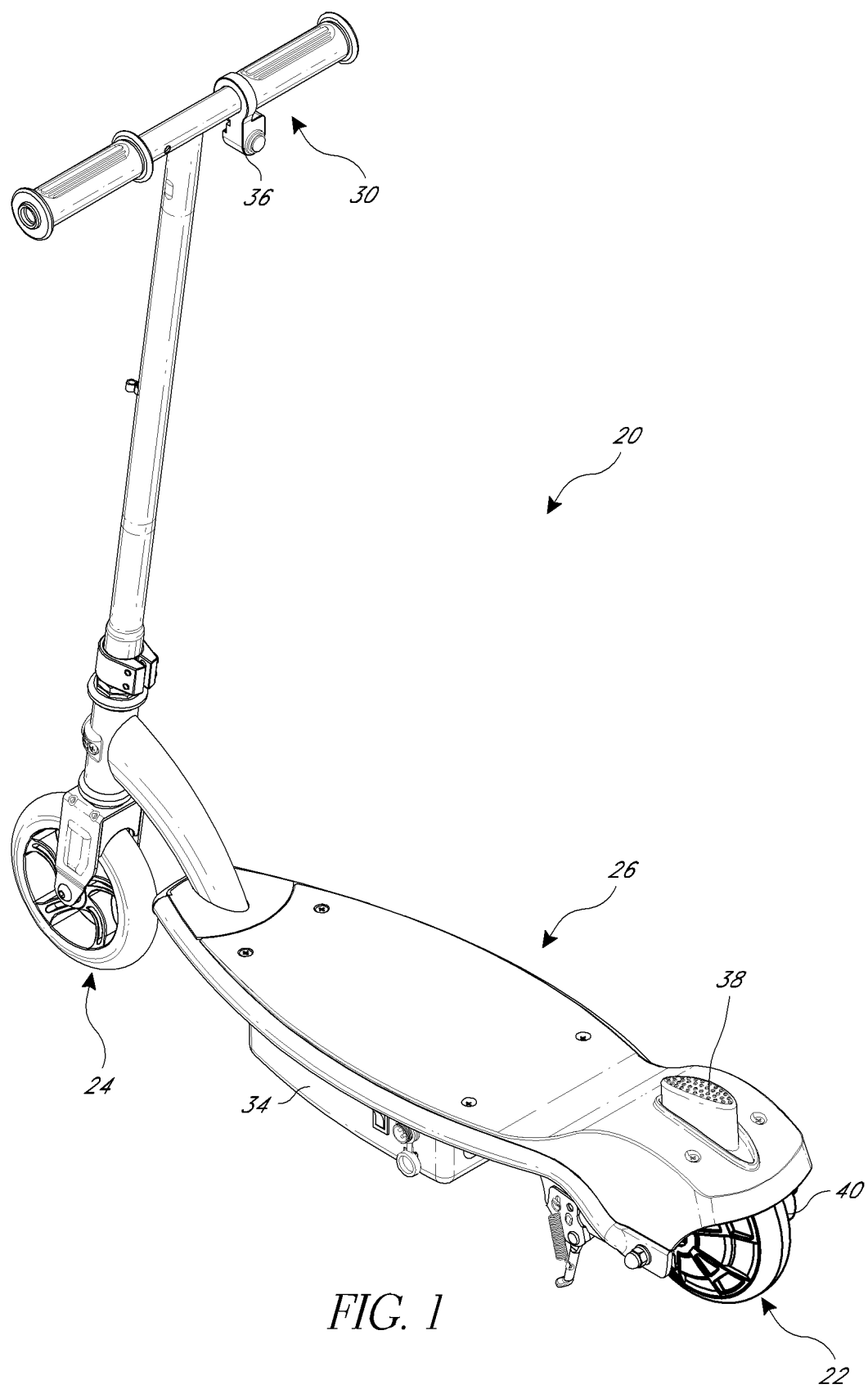
FIG. 1 illustrates a vehicle, such as an electric scooter, that incorporates one or more hub motor arrangements having certain features, aspects and advantages of a preferred embodiment.
Figure 2:
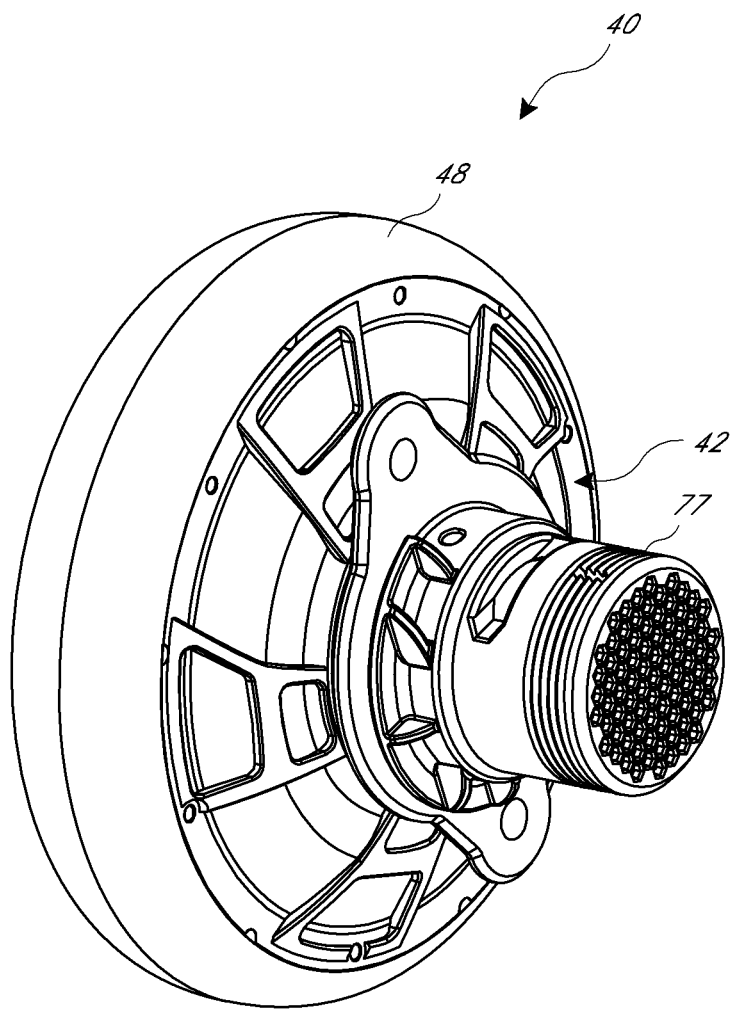
FIG. 2 is a perspective view of a first side of a hub motor arrangement suitable for use with the vehicle of FIGS. 1, 15 and 16.
Figure 3:
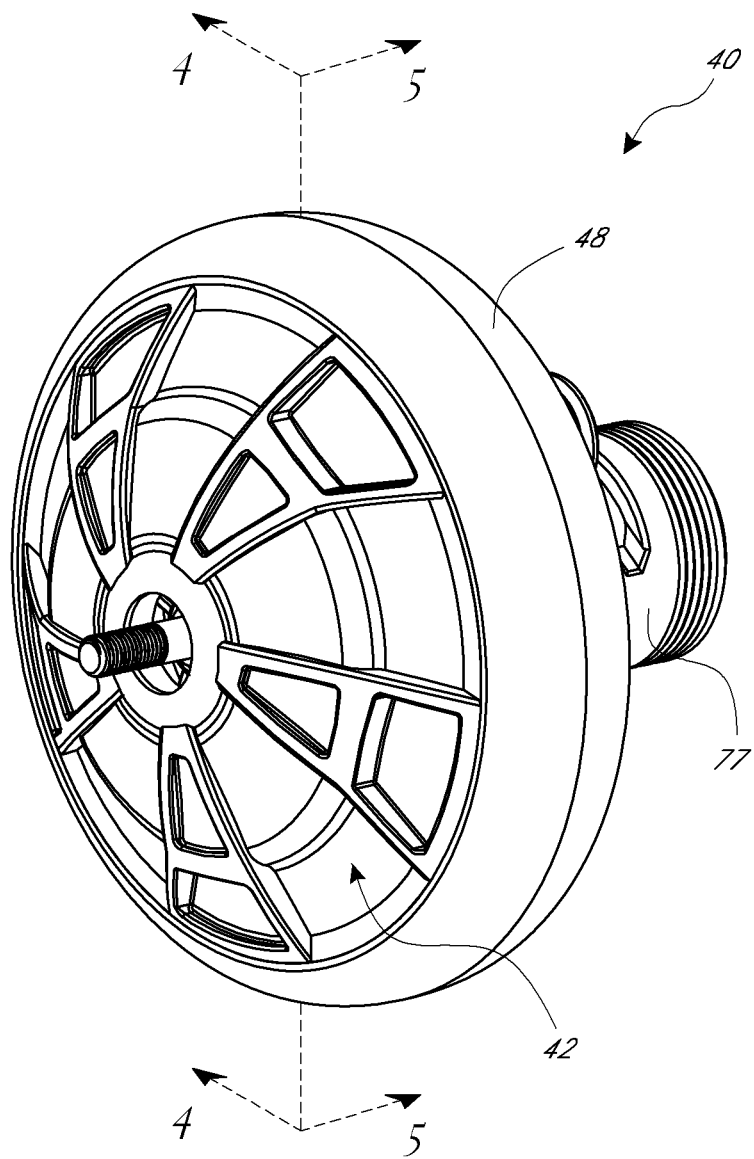
FIG. 3 is a perspective view of a second side of the hub motor arrangement of FIG. 2.
Figure 4:
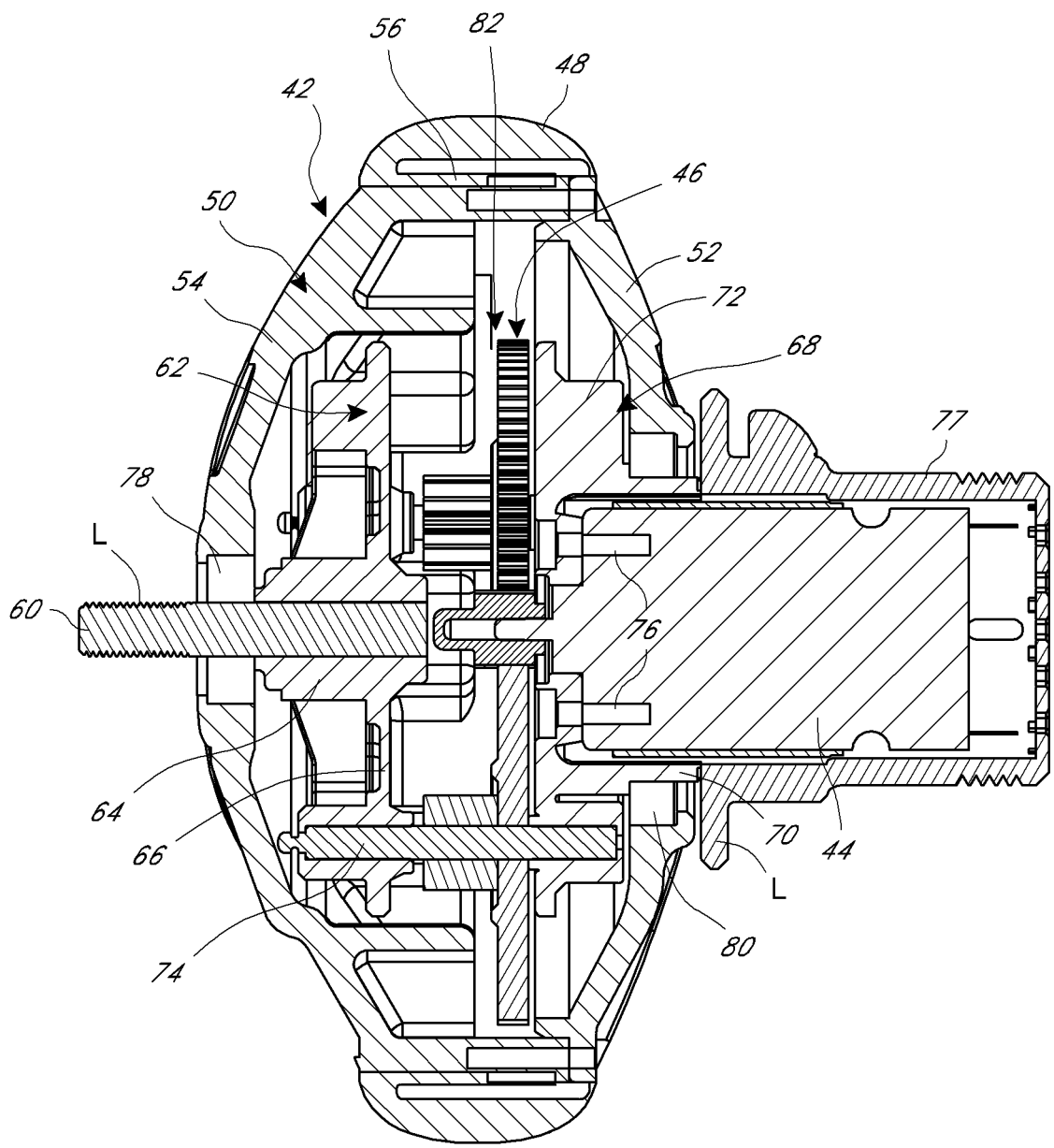
FIG. 4 is a sectional view of the hub motor arrangement of FIG. 2 taken along a plane that extends vertically through an axis of rotation of the hub motor arrangement.

The hub motor arrangements disclosed herein are well-suited for use in small diameter wheel applications, such as wheels suitable for use in ride-on vehicles for children, or other light weight vehicles. Thus, the hub motor arrangements are disclosed in the context of a ride-on vehicle for children herein although other uses and applications are contemplated. In some preferred arrangements, the vehicle wheels may be less than about 300, 200 or 100 millimeters in diameter. In addition, it is preferred that the motor used in the preferred hub motor arrangements is a standard, commercially-available "off-the-shelf" electric motor. The motor can be a brush DC motor having a rated power of about 25 to about 400 or more watts (W), or any value or sub-range of values within the recited range. In some embodiments, the motor can have a rated power of about 100 W. The motor can have an outer diameter of between about 20 and about 75 millimeters, between about 26 and about 42 millimeters, or about 35 or 36 millimeters. The motor can have a length of between about 20 and about 100 millimeters, between about 40 and about 66 millimeters, or about 55 to about 57 millimeters. A ratio of a diameter of the wheel to a diameter of the motor may be between about 2:1 to about 10:1, between about 3:1 to about 6:1, or between about 4:1 to about 5:1. In some configurations, the ratio is about 4:1. Preferably, such ratios are based on motors falling into the aforementioned range of diameters. Other suitable types of motors (e.g., brushless motors) could also be used. However, preferably, the motor is a standard, commercially-available motor (instead of a custom motor) to reduce the overall cost of and/or the space occupied by the hub motor arrangement. For example, a motor of the preferred embodiments may cost at the time of filing between about $0.5 to about $3.5, or about $2. Motors commonly used in hub motors can cost substantially more than the preferred, small commercially-available motors. Such motors are usually generally cylindrical in shape and have uninterrupted, circular outer end surfaces (as opposed to annular motors commonly used in hub motors), with the exception of the rotation motor shaft that extends from one end of the motor housing. Thus, the motor can occupy a portion of the central or rotational axis of the hub motor. A preferred motor can have a working or maximum rotational speed (rpm) that is substantially greater than the 4,000-5,000 rpm of current hub motors. For example, a preferred motor can have a speed that is greater than 10,000 rpm, between about 10,000 to about 20,000 rpm, between about 15,000 to about 16,000 rpm, or any value or sub-range within these ranges. In general, the torque produced by a motor is related to the motor diameter. Power is related to torque and speed (rpm). Thus, at least some of the preferred motors provide equivalent or a suitable level of power compared to the common hub motors based on greater speed partially or completely making up for the often reduced torque of the smaller diameter motor. The smaller motors presently preferred draw less current from the battery or other power source. For example, at an equivalent load (e.g., rider of about 120 lbs.), a preferred 100 W motor draws between about 2.8-4.0 amps during normal riding conditions compared to 4.5-7.0 amps drawn by a conventional hub motor. The reduced amperage results in longer battery life or operating life between charges.

FIG. 1 illustrates a vehicle, such as an electric scooter (e.g., a kick-type scooter) 20, which incorporates one or more drive wheels 22 each of which provides a drive torque that rotates the wheel 22 to propel the vehicle 20. Preferably, each drive wheel 22 incorporates a hub motor arrangement 40. Although a scooter 20 is shown and described herein, the hub motor arrangement 40 can be incorporated in other types of vehicles, as well. Examples of such vehicles are described further below. Furthermore, any suitable number of hub motor arrangements 40 or drive wheels 22 can be used, including a single wheel or all of the vehicle wheels. If less than all of the wheels are drive wheels 22, the remaining wheels can be non-drive wheels 24. Such non-drive wheels 24 can be of any suitable arrangement, such as fixed direction wheels, steerable wheels or casters, for example. In the illustrated arrangement, the rear wheel is the drive wheel 22 and the front wheel 24 is a non-driven and steerable wheel, as is generally the arrangement in an electric kick-style scooter.

Preferably, the scooter 20 includes a body 26 that is supported by the wheels 22 and/or 24. In the illustrated arrangement, two wheels 22, 24 are provided at each of the front and rear portions of the vehicle body 26; however, the vehicle 20 could have other numbers and/or arrangements of wheels, including one, two, three or more than four wheels. The illustrated vehicle 20 includes a deck 28 for a rider of the vehicle 20 to place one or both of his or her feet and a steering arrangement 30, such as a handlebar, which permits a user to steer one or more of the wheels 22, 24.

The vehicle 20 preferably also includes a source of power, such as a battery 34, to provide electric power to the hub motor arrangement(s) 40 via a suitable wired or wireless connection. The vehicle 20 preferably also includes a throttle or speed controller 36, such as a foot pedal, thumb or finger button or a hand grip twist throttle, that is accessible to the user and allows the user to modulate the drive torque produced by the hub motor arrangement(s) 40. A control arrangement or controller (not shown) can be provided to receive signals from the throttle or speed controller, process such signals and provide control signals to the hub motor arrangement(s) 40. A suitable brake arrangement 38 preferably is also provided that is configured to provide a braking force to one or more of the wheels 22, 24. Such a brake arrangement could include regenerative braking that charges the battery 34 during braking, if desired. Other non-regenerative braking arrangements could be provided in addition or in the alternative. One suitable brake system is described in Applicant's Patent Publication No. 2013/0186702, the entirety of which is incorporated by reference herein.

FIGS. 1-6 illustrate a hub motor arrangement 40 that is well-suited for use with the vehicle 20 of FIG. 1 or other vehicles. The hub motor arrangement or drive wheel arrangement 40 includes a body or housing 42, which at least partially encloses a motor 44 and transmission assembly 46. Preferably, a tire or other traction element 48 that contacts a surface upon which the associated vehicle is ridden is adjacent to or is directly carried by the housing 42. That is, preferably, a diameter of the traction element 48 is similar to but preferably slightly larger than a diameter of the housing 42 and no substantial structural elements (e.g., spokes and rim) are provided between the housing 42 and the traction element 48. Thus, the illustrated hub motor arrangement 40 is well-suited for small diameter wheel applications, such as ride-on vehicles for children.

As described above, preferably, the motor 44 is a standard, commercially-available small DC brush motor. The transmission assembly 46 is configured to convert the speed and torque of the motor 44 into a speed and torque suitable for the drive wheel (housing 42 and traction element 48). In addition, the motor 44 and transmission assembly 46 are configured for accommodation in the housing 42 that is suitably sized and shaped for use as a drive wheel for a small vehicle. In part, this is accomplished by positioning the motor 44 preferably along a center axis of the hub motor arrangement 40 and offset axially or laterally to one side of a central plane of the hub motor arrangement 40 or of the traction element 48. However, in some configurations, the motor 44 could be off-center and/or spaced from the center axis of the hub motor arrangement 40. Preferably, the motor 44 is surrounded by one or both of a support bearing for the housing 42 and a mount of the hub motor arrangement 40. In the illustrated arrangement, a portion of the motor 44 is laterally or axially inboard of the support bearing and/or mount that is nearest the motor 44 (if multiple bearings/mounts are provided) and a portion of the motor 44 is laterally or axially outboard of the support bearing and/or mount. Advantageously, with such an arrangement, a standard motor 44 can be used along with a transmission assembly 46 suitable to convert the power of the motor into suitable drive power for the drive wheel arrangement 40 to provide a relatively low-cost drive system for small or child vehicle applications. In addition, such an arrangement preserves space for the transmission of the hub motor arrangement 40.

The illustrated housing 42 comprises a first housing portion or drum 50 and a second housing portion or cover 52. Together, the drum 50 and cover 52 define an interior space that contains the transmission assembly 46 and accommodates at least a portion of the motor 44. Preferably, the drum 50 defines a sidewall portion 54 and an annular end wall portion 56 that carries the traction element 48. The cover 52 is securable to the end of the annular end wall portion 56 opposite the sidewall portion 54 by a suitable arrangement (e.g., one or more fasteners) and defines a second sidewall portion of the housing 42.

The illustrated hub motor arrangement 40 also includes an axle shaft 60 (also referred to simply as the "axle") that, preferably, and in the illustrated arrangement, does not extend entirely through the housing 42, but is an interrupted axle arrangement in which the axle 60 extends only partially through the housing 42 in the axial direction. The axle 60 preferably defines an axis of rotation for the housing 42. The axle 60 can be a metal shaft, or can be another suitable structure. For example, the housing 42 could have left-right symmetry and the axle 60 could be substantially larger in diameter than illustrated. Thus, the term "axle" is a broad term used with its ordinary meaning, which can include structures for rotatably supporting another object.

Preferably, when incorporated into an associated vehicle, both sides of the hub motor arrangement 40 are supported; however, the axle 60 supports only one side of the hub motor arrangement 40. A first lateral support member 62 is supported by an inboard end of the axle 60. The first lateral support member 62 includes a central boss or hub portion 64 and a vertically-oriented plate portion 66 located on a laterally-inward end (toward the central plane of the hub motor arrangement 40) of the hub portion 64. A second lateral support member 68 also includes a central boss or hub portion 70 and a vertically-oriented plate portion 72 located on a laterally-inward end of the hub portion 70. Thus, the plate portion 66 of the first lateral support member 62 faces the plate portion 72 of the second lateral support member 68 with the respective hub portions 64 and 70 extending away from one another in a lateral direction. A space is provided between the plate portion 66 of the first lateral support member 62 and the plate portion 72 of the second lateral support member 68, which space accommodates one or more components of the transmission assembly 46.

The first lateral support member 62 and the second lateral support member 68 are connected by a plurality (e.g., three) of connecting shafts 74 that preferably are located at identical radial positions and spaced at equal angles from one another. In other arrangements, different numbers of connecting shafts 74 can be provided, such as one, two, five or more. The connecting shafts 74 can be secured to the support members 62 and 68 by any suitable arrangement. In the illustrated configuration, the connecting shafts 74 are embedded into one of the support members 62 and 68 (i.e., the second lateral support member 68) during the manufacture of the support member 62 or 68. For example, the second lateral support member 68 can be a molded member (e.g., injection-molded) and can be molded over end portions of the connecting shafts 74. The other support member 62 or 68 can be secured to the connecting shafts 74 by any suitable arrangement, such as via one or more fasteners or a snap-fit or press-fit arrangement, for example. Preferably, the connecting shafts 74 overlap one or both of the motor 44 and the axle 60 in a lateral or axial direction (along the axis of rotation).

The hub portion 70 of the second lateral support member 68 preferably surrounds at least a portion of the motor 44. Preferably, the hub portion 70 of the second lateral support member 68 extends along a substantial length of the motor 44, such as at least about one-half or at least about two-thirds of a length of the motor 44. In addition, preferably, the motor 44 is secured to the second lateral support member 68 by a suitable arrangement, such as one or more fasteners 76, which extend through a portion of the plate portion 72 of the second lateral support member 68 located adjacent to an end surface of the motor 44. A cover 77 can cover a laterally outboard portion of the motor 44 and can be used to secure at least one side of the hub motor arrangement 40 to a vehicle. For example, the cover 77 can include a mounting plate portion that can be vertically-oriented (perpendicular to the axis of rotation). The cover 77 can also include features to help keep the motor 44 cool, such as cooling fins and or vent openings, for example. In some configurations, the motor 44 can transfer load from the cover 77 to the hub portion 70 of the second lateral support member 68.

Preferably, one or both of the hub portion 64 of the first lateral support member 62 and the hub portion 70 of the second lateral support member 68 extends from within the housing 42 to outside of the housing 42. A first bearing 78 is interposed between the housing 42 (the drum or first housing portion 50) and the hub portion 64 of the first lateral support member 62 and a second bearing 80 is interposed between the housing 42 (the cover or second housing portion 52) and the hub portion 70 of the second lateral support member 68. With such an arrangement, the axle 60, first lateral support member 62, connecting shafts 74 and the second lateral support member 68 function as an axle shaft of the hub motor arrangement 40 about which the housing 42 rotates on the bearings 78 and 80. In some configurations, the motor 44 could be completely outside of the housing 42 (e.g., outside bearing 80) or completely within the housing 42, depending on factors such as the amount of space available, especially in a width direction (along the center or rotational axis). However, in at least the illustrated arrangement, preferably the motor 44 is reasonably accessible without significant disassembly of the hub motor arrangement 40. Such an arrangement allows the motor 44 to be replaced in a cost effective manner in the event of failure, unlike conventional hub motors that utilize motors that are integrated with the housing and other major structural elements.

Advantageously, the illustrated arrangement is not a through-shaft type of arrangement in which an axle member or arrangement passes completely through the center of the hub motor, but is a distributed axle arrangement that provides suitable support while permitting the motor 44 to be centrally-located or aligned with a central, rotational axis of the hub motor arrangement 40 and to occupy a portion of the axis of rotation. That is, the motor 44 is not a hollow design that surrounds the axis of rotation. Such an arrangement provides a well-balanced hub motor arrangement 40 while permitting the use of a standard, commercially-available "off-the-shelf" motor 44 to keep costs low. In addition, as described herein, one or more of the first lateral support member 62, connecting shafts 74 and the second lateral support member 68 are also components of the transmission assembly 46, which results in an efficient overall structure that reduces the total number of parts of the hub motor arrangement 40 to keep costs low. Although through-shaft type axle designs can also permit a motor to be aligned with a central, rotational axis of a motor, such an arrangement would require a custom motor design or at least a large motor design because the axle needs to be sufficient to support a substantial portion of the weight of the associated vehicle. In the illustrated arrangement, the shaft of the motor 44 preferably does not support any significant weight of the associated vehicle.

In the illustrated arrangement, the first bearing 78 and the second bearing 80 have different diameters. The first bearing 78 surrounds the axle 60 and the hub portion 64 of the first lateral support member 62. The second bearing 80 is larger than the first bearing 78 and surrounds the motor 44 and the hub portion 70 of the second lateral support member 68. Preferably, the second bearing 80 is axially aligned with an intermediate portion of the motor 44 such that a portion of the motor 44 is located inboard (within the housing 42 and/or closer to the central plane) of the second bearing 80 and a portion of the motor 44 is located outboard (outside of the housing 42 and/or further from the central plane) of the second bearing 80. In addition, in at least some configurations, the hub motor arrangement 40 is mounted to an associated vehicle at a mount location L such that the mounting portion of the vehicle surrounds the motor 44. The mount location L preferably is outboard of the second bearing 80 and may be axially aligned with a portion of the hub portion 70 of the second lateral support member 68 such that the mounting portion of the vehicle is directly or indirectly supported on the hub portion 70 of the second lateral support member 68. A second mount location L is provided by a portion of the axle 60 outboard of the hub portion 64 of the first lateral support member 62. Such an arrangement allows the width of the housing 42 to be reduced or minimized, which is advantageous for vehicles with limited space in a width direction, such as two-wheeled scooters for example and without limitation. That is, if the mount location L surrounds the motor 44, the space for the hub motor arrangement 40 does not have to accommodate the entire width (or, in the illustrated arrangement, the axial length) of the motor 44. Moreover, the direct drive arrangement of the hub motor arrangement 40 allows the chain drive arrangement of prior electric scooters to be omitted, which saves significant weight and cost.

The transmission assembly 46 preferably comprises a planetary gear arrangement 82 that transfers torque from the motor 44 to the housing 42. In the illustrated arrangement, the planetary gear arrangement 82 includes a sun gear 84, a plurality of planet gears 86 and a ring gear 88. Preferably, the sun gear 84 is driven by an output shaft of the motor 44. In the illustrated arrangement, the planet gears 86 are double spur gears configured such that the sun gear 84 drives a first gear portion 86a of each of the planet gears 86 and a second gear portion 86b of each of the planet gears 86 drives the ring gear 88. In other arrangements, the planet gears 86 could have a single portion. The portions 86a and 86b of the planet gears 86 are formed by a unitary gear member in the illustrated arrangement; however, in other arrangements, the portions 86a and 86b could be formed by separate components preferably that are coupled for rotation with one another. The planet gears 86 are supported for rotation by a respective one of the connecting shafts 74. In the illustrated arrangement, there are equal numbers of shafts 74 and planet gears 86. However, in other configurations, one or more shafts 74 could be structural only and not carry a planet gear 86. Thus, there could be two, three, four, five or more shafts 74 and planet gears 86 carried by one or any number of additional shafts 74 less than the entirety of available shafts 74, for example.

In the illustrated arrangement, the ring gear 88 is an annular component that is separate from the first and second housing portions 50, 52. Such an arrangement at least partially isolates the ring gear 88 from loads applied to the housing 48, which can be advantageous for higher load applications (e.g., larger vehicles). However, in alternative arrangements, the ring gear 88 could be integrated with the one or more portions of the housing 42 (e.g., portions 50 and/or 52), such as for lower load applications (e.g., smaller vehicles). Preferably, the ring gear 88 surrounds the connecting shafts 74 or, in other words, the connecting shafts 74 pass through the central opening of the annular ring gear 88. An inner surface of the annular ring gear 88 defines a gear portion 88a (e.g., gear teeth) of the ring gear 88. An outer surface of the ring gear 88 defines a plurality of drive protrusions 90 that define recesses 92 in between.

Similarly, the drum portion or first housing portion 50 of the housing 42 has an inner surface that defines a plurality of drive protrusions 94 with recesses 96 in between. Preferably, the recesses 92 and 96 of the ring gear 88 and the housing 42, respectively, are sized and shaped to accommodate the drive protrusions 94 and 90 of the housing 42 and the ring gear 88. In some arrangements, the drive protrusions 90 and 94 (and recesses 92 and 96) can have substantially the same size and shape or complementary sizes and shapes. Preferably, the drive protrusions 90 and 94 are fairly large (as compared to gear teeth) to ease manufacturing and assembly. For example, in one arrangement, eight protrusions 90 and 94 can be provided on each of the ring gear 88 and the housing 42 and the protrusions 90 of the ring gear 88 have a smaller radial dimension than the protrusions 94 of the housing 42. Thus, the ring gear 88 can transfer rotational motion from the planetary gear arrangement 82 to the housing 42.

In operation, the motor 44 can be powered by a suitable power source (e.g., a battery) and activated by a suitable user control, such as a throttle pedal, button, paddle or handgrip twist arrangement, for example and without limitation. The motor 44 rotates the sun gear 84, which rotates the planet gears 86. As described, the first lateral support member 62, connecting shafts 74 and the second lateral support member 68 (along with the axle 60) function as an axle assembly of the hub motor arrangement 40 about which the housing 42 rotates. Thus, the first lateral support member 62 and/or the second lateral support member 68, along with the connecting shafts 74, can be considered as a stationary carrier for the planet gears 86. Therefore, in the illustrated arrangement, the planet gears 86 rotate about the connecting shafts 74, but otherwise do not rotate as a unit (with the first lateral support member 62, connecting shafts 74 and the second lateral support member 68) relative to the motor 44. Rather, the rotation of the planet gears 86 drives or causes rotation of the ring gear 88, which, in turn, drives the housing 42.

One or more of the hub motor arrangements 40 can be used to provide driving power to an associated vehicle. The hub motor arrangement 40 can be driven in a forward direction only, or can have both forward and reverse operations by changing the rotational direction of the motor 44. One-way bearings or clutch mechanisms can be employed to allow driving force in one direction (e.g., forward), while permitting the housing 42 to rotate faster than it is being driven by the motor 44 (over speed) and/or to permit the housing 42 to be free-wheeled in a second direction (e.g., reverse). Alternatively, the hub motor arrangement 40 can be configured for forward operation only, with reverse motion requiring the resistance of the motor 44 to be overcome.

The planetary gear arrangement 82 can provide any desired overall gear ratio to convert the torque or power provided by the motor 44 into suitable torque or power for driving the housing 42 and, thus, the traction element 48 depending on the desired operational speed of the hub motor arrangement 40 and associated vehicle. In the illustrated arrangement, the sun gear 84 is many times smaller (in diameter and/or number of gear teeth) than the first portions 86a of the planet gears 86. The second portions 86b of the planet gears 86 are many times smaller (in diameter and/or number of gear teeth) than the first portions 86a of the planet gears 86. In one arrangement, the sun gear 84 has between about 10-20 teeth (e.g., 15 teeth), the first portions 86a of the planet gears 86 have between about 50-100 teeth (e.g., 75 teeth), the second portions 86b of the planet gears 86 have between about 10-20 teeth (e.g., 12 teeth) and the ring gear 88 has between about 60-120 teeth (e.g., 88 teeth or 85-90 teeth) or any value or sub-range within the recited ranges. However, in other arrangements, other numbers of gear teeth can be provided for any gear components of the planetary gear arrangement 82. In some configurations, the transmission 46 can have an overall ratio of between about 1:20 to about 1:40 or any value or sub-range of values within this range, such as about 1:30, for example and without limitation.

The components of the hub motor arrangement 40 can be constructed from any suitable material or combinations of materials by any suitable processes. For example, the axle 60 and connecting shafts 74 can include or can be made from a metal material, such as steel. Other components or assemblies (e.g., the housing 42, support members 62 and 68, gears 84, 86 and 88) can be constructed from a suitable plastic material by a suitable process (e.g., injection molding). The tire or traction element 48 can be constructed from a suitable rubber or rubber-like material, such as polyurethane, for example. The material of the traction element 48 can be molded directly onto the housing 42 or can otherwise be suitable coupled to the housing 42. As illustrated, the outer periphery of the housing 42 can include an engagement structure 98 that assists in coupling the traction element 48 to the housing 42. The engagement structure 98 can be a rim or hoop member that is supported in a spaced configuration from the annular surface of the housing 42 by supports, such as U-shaped supports, that together create open spaces that can be filled by the material of the traction element 48 to obtain mechanical engagement between the housing 42 and the traction element 48 to resist separation or relative rotation therebetween. In some arrangements, the traction element 48 can include an interior space that is filled with a gas or other soft material to facilitate deformation of the traction element 48 to conform to irregularities of the surface on which the associated vehicle is operated.

An alternative drive wheel arrangement or hub motor arrangement 100 is illustrated in FIGS. 7-11 and is suitable for similar applications as the hub motor arrangement 40 and, preferably, also makes use of a commercially-available standard DC brush motor. The hub motor arrangement 100 includes a housing 102 that houses the motor 104. A transmission assembly 106 transmits power from the motor 104 to the housing 102. The housing 102 is configured to rotate a tire or other suitable type of traction element 108 that contacts a surface upon which a vehicle associated with the hub motor arrangement 100 is operated. In one arrangement, the traction element 108 is carried directly by the housing 102 in a manner similar to that described with respect to the hub motor arrangement 40. The traction element 108 can be a rubber or rubber-like material (e.g., polyurethane) that is formed directly onto the housing 102, for example. The housing 102 can include features that create mechanical engagement between the housing 102 and the traction element 108 to resist separation or relative rotation therebetween.

Figure 7:
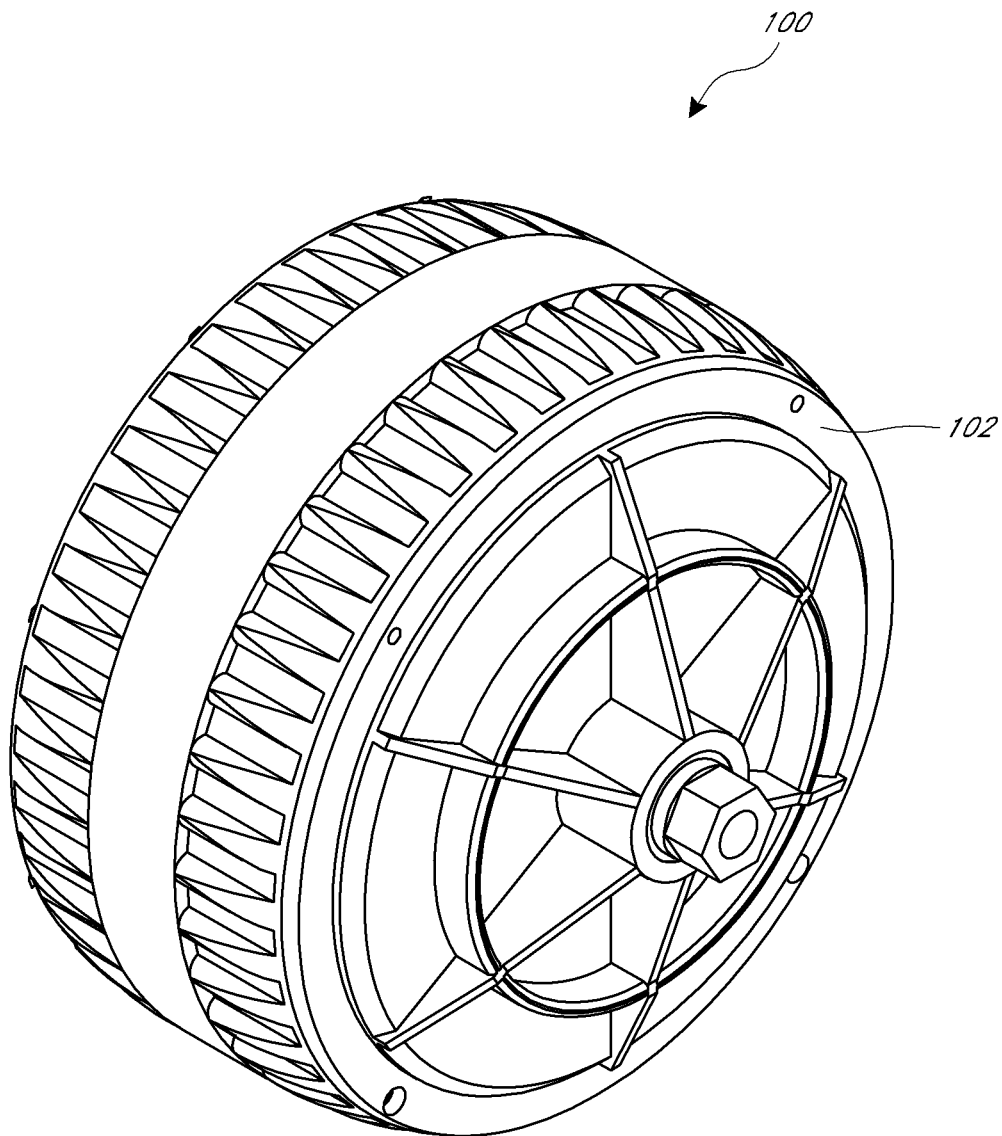
FIG. 7 is a perspective view of a first side of another hub motor arrangement suitable for use with the vehicle of FIGS. 1, 15 and 16.
Figure 8:
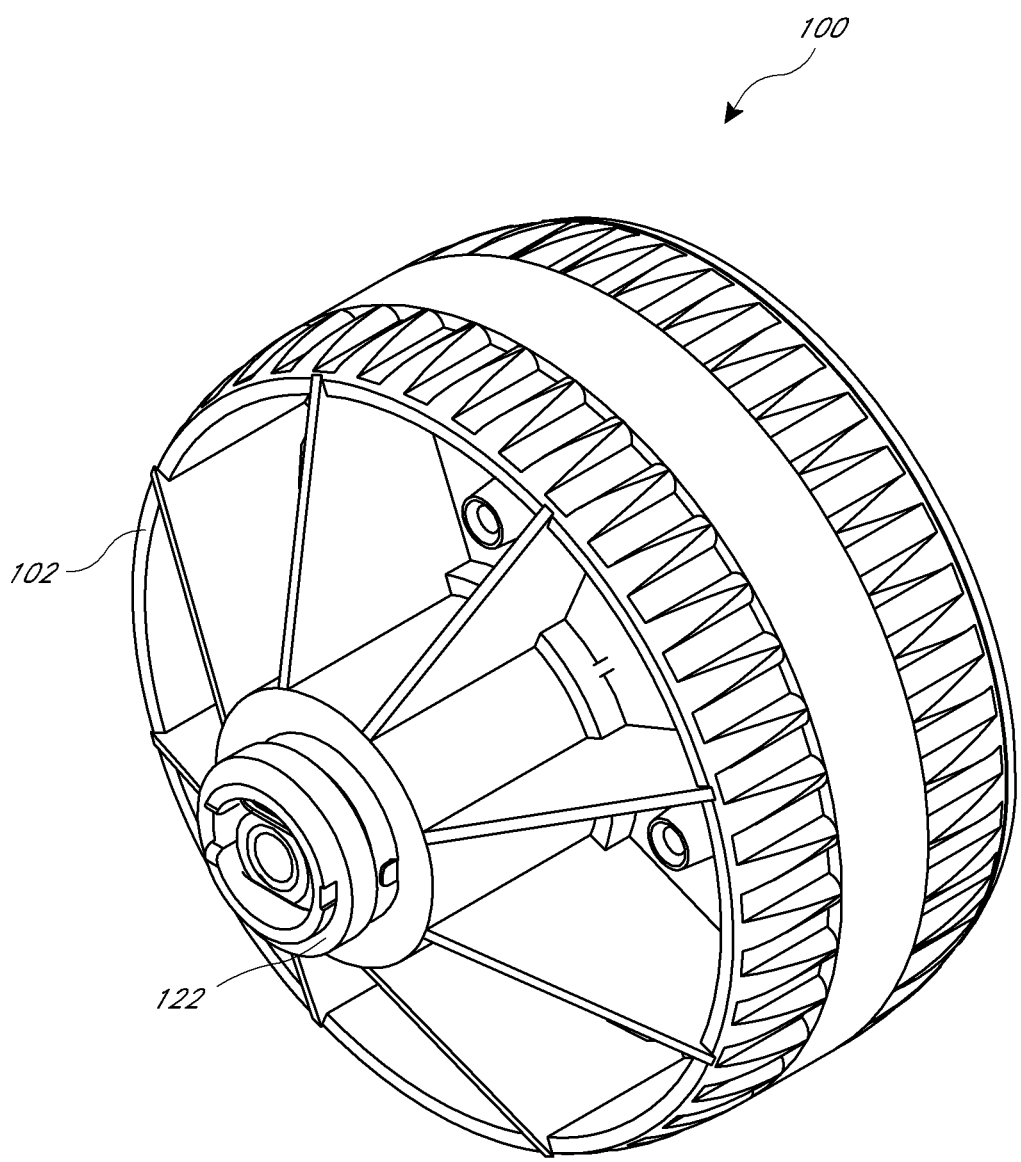
FIG. 8 is a perspective view of a second side of the hub motor arrangement of FIG. 7.
Figure 9:
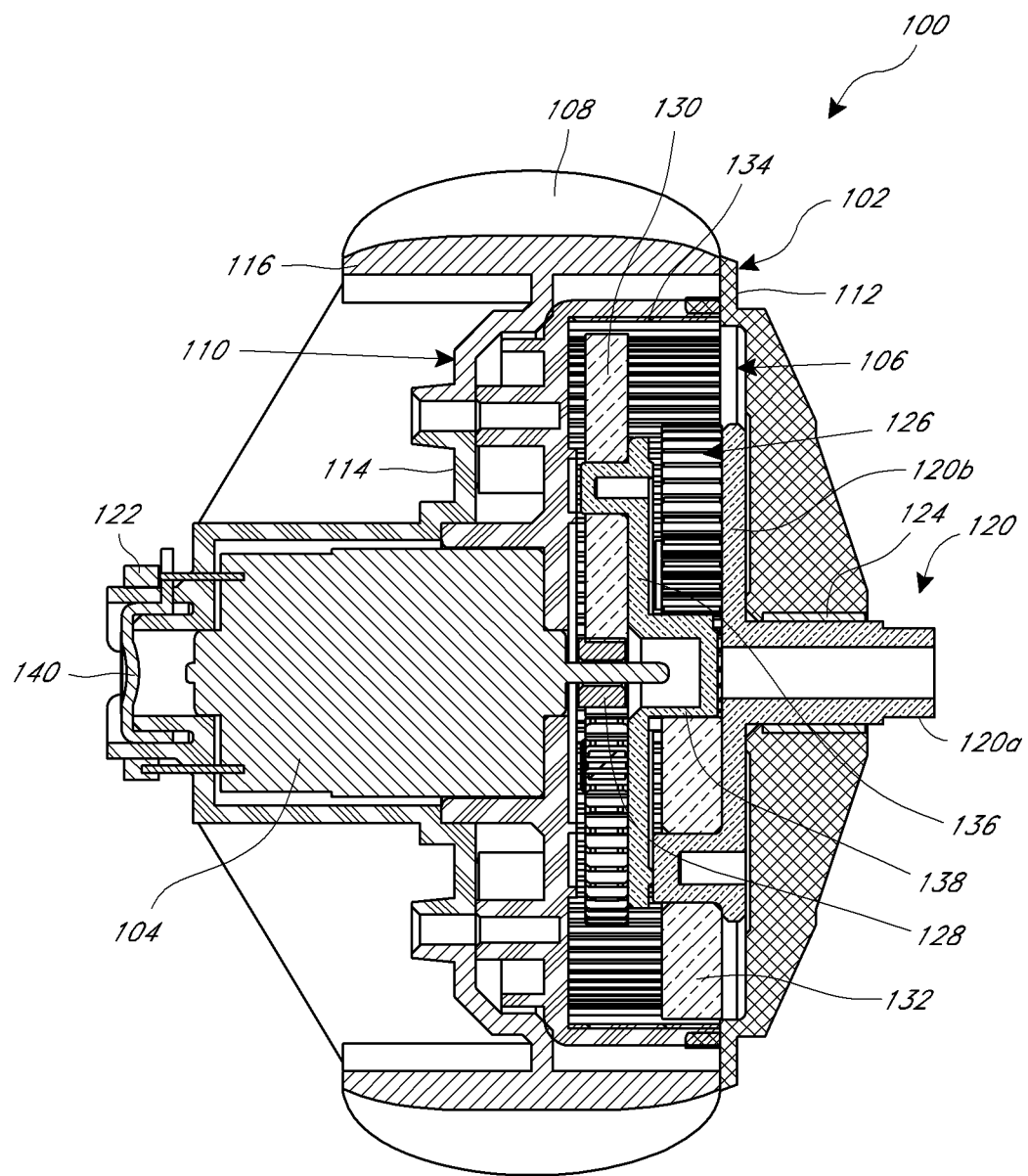
FIG. 9 is a sectional view of the hub motor arrangement of FIG. 7 taken along a plane that extends vertically through an axis of rotation of the hub motor arrangement.
Figure 10:
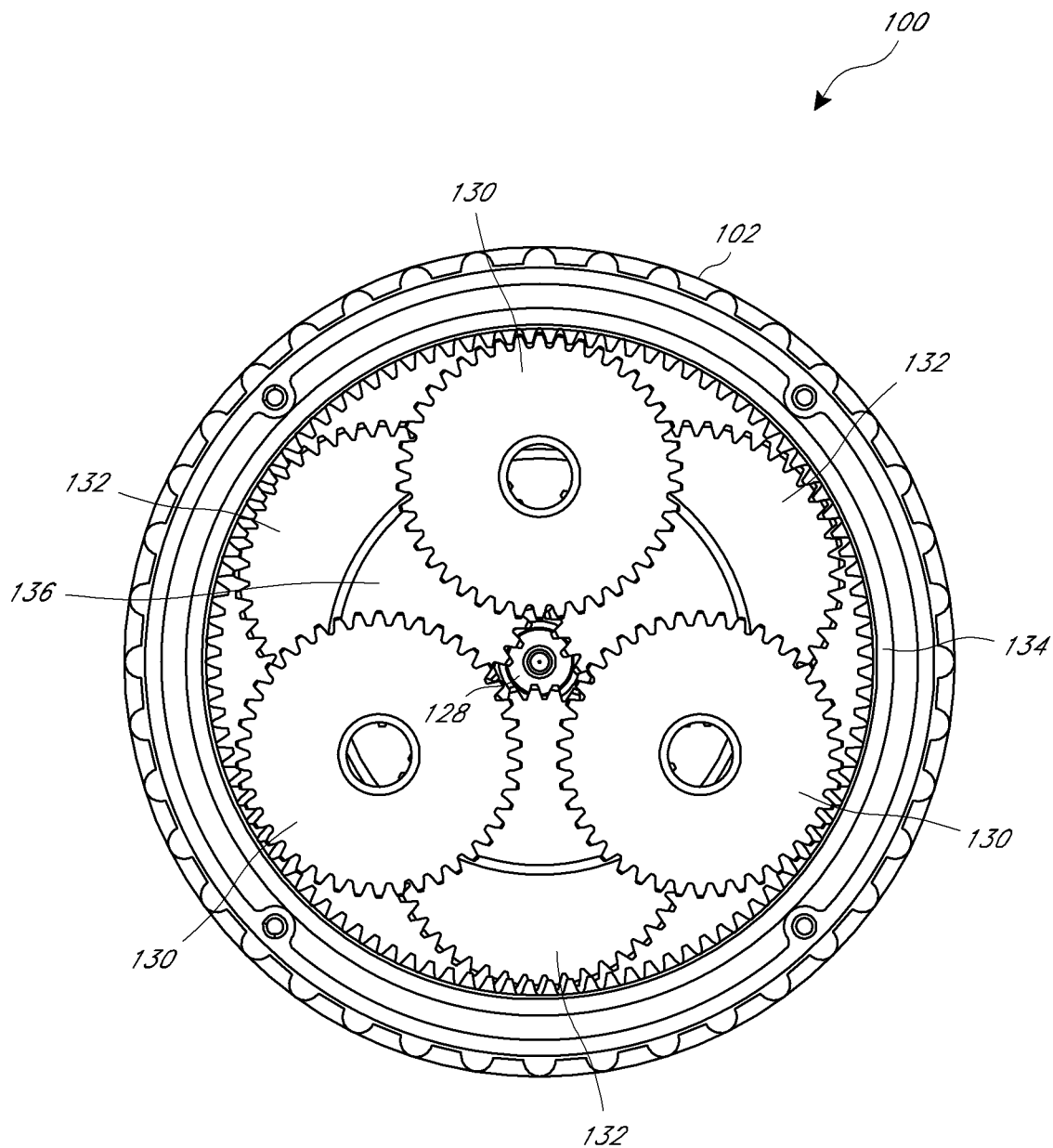
FIG. 10 is a sectional view of the hub motor arrangement of FIG. 7 taken along a plane that extends vertically and perpendicular to the axis of rotation of the hub motor arrangement.
Figure 11:
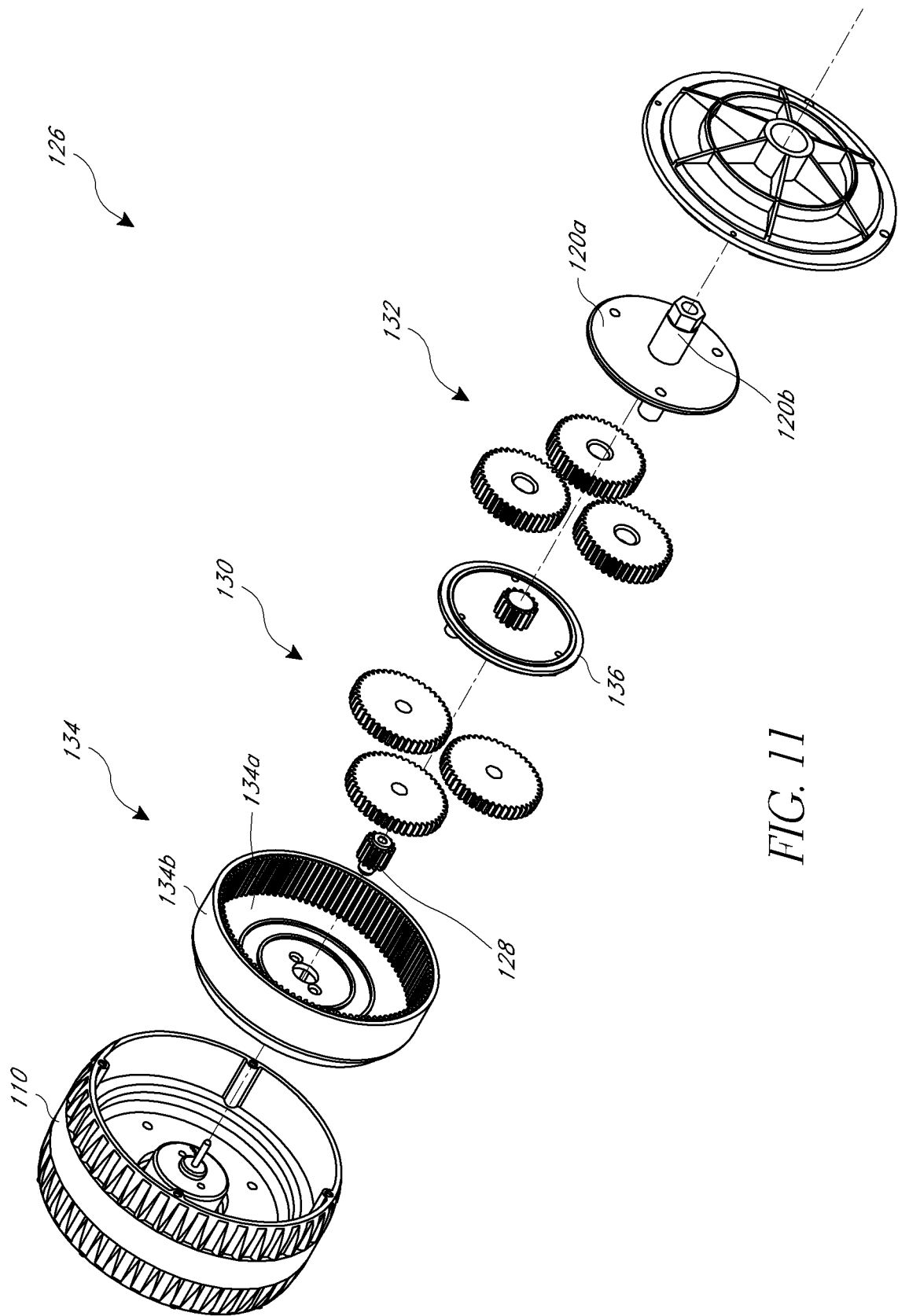
FIG. 11 is perspective view of the hub motor arrangement of FIG. 7 with components shown in an exploded condition.

The illustrated housing 102 comprises a first housing portion or drum 110 and a second housing portion or cover 112. Together, the drum 110 and cover 112 define an interior space that contains the transmission assembly 106 and accommodates a portion of the motor 104. As illustrated in FIGS. 7 and 8, the drum 110 and cover 112 can include radial and/or circumferential stiffening ribs. The ribs of the drum 110 can also act as cooling fins for the motor 104. Preferably, the drum 110 defines a radially-extending sidewall portion 114 and an annular end wall portion 116 that carries the traction element 108. In the illustrated arrangement, an outer portion of the sidewall portion 114 is generally centrally-located relative to a central, vertical plane passing through the hub motor arrangement 100. A central portion of the sidewall portion 114 extends in an axial direction away from the central plane to define a space sized and shaped to accommodate the motor 104 with a rotational axis of the motor 104 substantially aligned with the rotational axis of the housing 102 and overall hub motor arrangement 100. The cover 112 is securable to the end of the annular end wall portion 116 opposite the central portion of the sidewall portion 114 by a suitable arrangement (e.g., one or more fasteners) and defines a second sidewall portion of the housing 102.

The hub motor arrangement 100 also includes an axle member 120 (also referred to simply as the "axle") that, in the illustrated arrangement, does not extend entirely through the housing 102, but is an interrupted axle arrangement in which the axle 120 extends only partially through the housing 102 in the axial direction. When incorporated into an associated vehicle, one or both sides of the hub motor arrangement 100 are supported; however, the axle 120 supports only one side of the hub motor arrangement 100. In the illustrated arrangement, the axle 120 includes an axially-extending first or axle portion 120a and a radially or vertically-extending portion or plate portion 120b. As described further herein, the plate portion 120b forms a portion of the transmission assembly 106.

In the illustrated arrangement, one side of the housing 102 is supported for rotation relative to a mounting portion of an associated vehicle by a first bearing 122 of any suitable arrangement. In particular, the first bearing 122 supports the central portion of the sidewall portion 114 of the drum or first portion 110 of the housing 102 for rotation relative to a mounting portion of the associated vehicle, which can surround the first bearing 122. Preferably, the first bearing 122 is located axially outward (away from the central plane) from the motor 104. The housing 102 is also supported for rotation on the axle 120 by a second bearing 124 of any suitable arrangement. In particular, the second bearing 124 can be a bushing and can support the cover or second portion 112 of the housing 102 for rotation on the axle 120. The axle 120 preferably is supported by a suitable mounting portion of the associated vehicle, such as at a location outboard of the housing 102. Thus, the first bearing 122 and the second bearing 124 can have different diameters and, similarly, the mounting portions of the associated vehicle on each side of the hub motor arrangement 100 can have different internal sizes or diameters.

The transmission assembly 106 preferably comprises a planetary gear arrangement 126 that transfers torque from the motor 104 to the housing 102. In the illustrated arrangement, the planetary gear arrangement 126 includes a sun gear 128, a plurality of first planet gears 130, a plurality of second planet gears 132 and a ring gear 134. The plurality of first planet gears 130 are supported by a first planet carrier 136. The first planet carrier 136 also defines a carrier sun gear 138, which engages the plurality of second planet gears 132. The plurality of second planet gears 132 are carried by the plate portion 120b of the axle member 120. Each of the plurality of first planet gears 130 and the plurality of second planet gears 132 engage the ring gear 134.

Preferably, the sun gear 128 is driven by an output shaft of the motor 104. The sun gear 128 drives the plurality of first planet gears 130, which drive the ring gear 134. Rotation of the plurality of first planet gears 130 also causes rotation of the first planet carrier 136. The carrier sun gear 138 rotates with the first planet carrier 136 and drives the plurality of second planet gears 132. As described previously, the axle member 120 is stationary and, thus, the plate portion 120b remains stationary and the plurality of second planet gears 132 simply rotate about their axes on the stationary plate portion 120b of the axle member 120. The plurality of first planet gears 130 and the plurality of second planet gears 132 drive the ring gear 134.

In the illustrated arrangement, the ring gear 134 is a generally bowl-shaped component that is separate from the first and second housing portions 110, 112; however, in alternative arrangements, the ring gear 134 could be integrated with the one or more portions of the housing 102 (e.g., portions 110 and/or 112). Preferably, the ring gear 134 defines a vertically or radially-oriented sidewall portion 134a and an axially-extending, annular end wall portion 134b. Preferably, a substantial portion of the sidewall portion 134a is substantially aligned with a central, vertical plane of the housing 102.

An inner surface of the annular end wall portion 134b defines a gear portion (e.g., gear teeth) of the ring gear 134. Preferably, the ring gear 134 is coupled to the housing 102 (e.g., to the drum portion or first housing portion 110) by a suitable fastening arrangement, such as one or more fasteners. Thus, the ring gear 134 can transfer rotational motion from the planetary gear arrangement 126 to the housing 102. Preferably, a central portion of the sidewall portion 134a of the ring gear 134 surrounds a portion of the motor 104 and engages the central portion of the sidewall portion 114 of the housing 102. In addition, preferably, the motor 104 is secured to the central portion of the sidewall portion 134a of the ring gear 134 by a suitable fastening arrangement, such as one or more fasteners. The ring gear 134 and the sidewall portion 114 of the first housing portion 110 define a pocket that accommodates the motor 104.

In the illustrated arrangement, because the motor 104 is secured to the housing 102, the motor 104 rotates along with the housing 102. In order to provide electrical power to the motor 104, a cup-shaped electrically-conductive member 140 is carried by the central portion of the sidewall portion 114 of the first housing portion 110 of the housing 102. The cup-shaped electrically-conductive member 140 is connected to one of the terminals (e.g., the negative terminal) of the motor 104. A bottom of the cup-shaped electrically-conductive member 140 (or sidewall in the illustrated orientation) can be contacted by a suitable electrical conduit (e.g., wire) during rotation of the cup-shaped electrically-conductive member 140 and housing 102. The other terminal (e.g., the positive terminal) of the motor 104 can be placed in contact with the first bearing 122, which can be utilized to transfer electrical current from a suitable electrical conduit (e.g., wire) to the positive terminal.

In operation, the motor 104 can be powered by a suitable power source (e.g., a battery) and activated by a suitable user control, such as a throttle pedal, button, paddle or handgrip twist arrangement, for example and without limitation. The motor 104 rotates the sun gear 128 in a first rotational direction, which rotates the plurality of first planet gears 130 in a second rotational direction. The rotation of the first planet gears 130 also causes rotation of the plurality of second planet gears 132 in the second rotational direction (via rotation of the carrier sun gear 138 in the first rotational direction). The rotation of the planet gears 130 and 132 drives or causes rotation of the ring gear 134 in the second rotational direction, which, in turn, drives the housing 102. Thus, the body or housing portion of the motor 104 rotates in the second rotational direction along with the ring gear 134 and opposite the direction of rotation of the shaft of the motor 104.

One or more of the hub motor arrangements 100 can be used to provide driving power to an associated vehicle. The hub motor arrangement 100 can be driven in a forward direction only, or can have both forward and reverse operations by changing the rotational direction of the motor 104. One-way bearings or clutch mechanisms can be employed to allow driving force in one direction (e.g., forward), while permitting the housing 102 to rotate faster than it is being driven by the motor 104 (over speed) and/or to permit the housing 102 to be free-wheeled in a second direction (e.g., reverse). Alternatively, the hub motor arrangement 100 can be configured for forward operation only, with reverse motion requiring the resistance of the motor 104 to be overcome.

The planetary gear arrangement 126 can provide any desired overall gear ratio to convert the torque or power provided by the motor 104 into suitable torque or power for driving the housing 102 and, thus, the traction element 108 depending on the desired operational speed of the hub motor arrangement 100 and associated vehicle. In the illustrated arrangement, the sun gear 128 is many times smaller (in diameter and/or number of gear teeth) than the first planet gears 130. The carrier sun gear 138 is many times smaller (in diameter and/or number of gear teeth) than the second planet gears 132. In one arrangement, the sun gear 128 has between about 10-20 teeth (e.g., 12 teeth), the first planet gears 130 have between about 30-60 teeth (e.g., 45 teeth), the carrier sun gear 138 has between about 15-35 teeth (e.g., 25 teeth), the second planet gears 132 have between about 35-50 teeth (e.g., 42 teeth) and the ring gear 134 has between about 75-125 teeth (e.g., 100 teeth). However, in other arrangements, other numbers of gear teeth can be provided for any gear components of the planetary gear arrangement 126. In some configurations, the transmission 106 can have an overall ratio of between about 1:80 to about 1:120 or any value or sub-range of values within this range, such as about 1:100, for example and without limitation.

The components of the hub motor arrangement 100 can be constructed from any suitable material or combinations of materials by any suitable processes. For example, the primary components (e.g., the housing 102, gears 128, 130, 132 and 134, axle 120 and first planet carrier 136) can be constructed from a suitable plastic material by a suitable process (e.g., injection molding). The tire or traction element 108 can be constructed from a suitable rubber or rubber-like material, such as polyurethane, for example. The material of the traction element 108 can be molded directly onto the housing 102 or can otherwise be suitable coupled to the housing 102. In some arrangements, the traction element 108 can include an interior space that is filled with a gas or other soft material to facilitate deformation of the traction element 108 to conform to irregularities of the surface on which the associated vehicle is operated.

Figure 12:
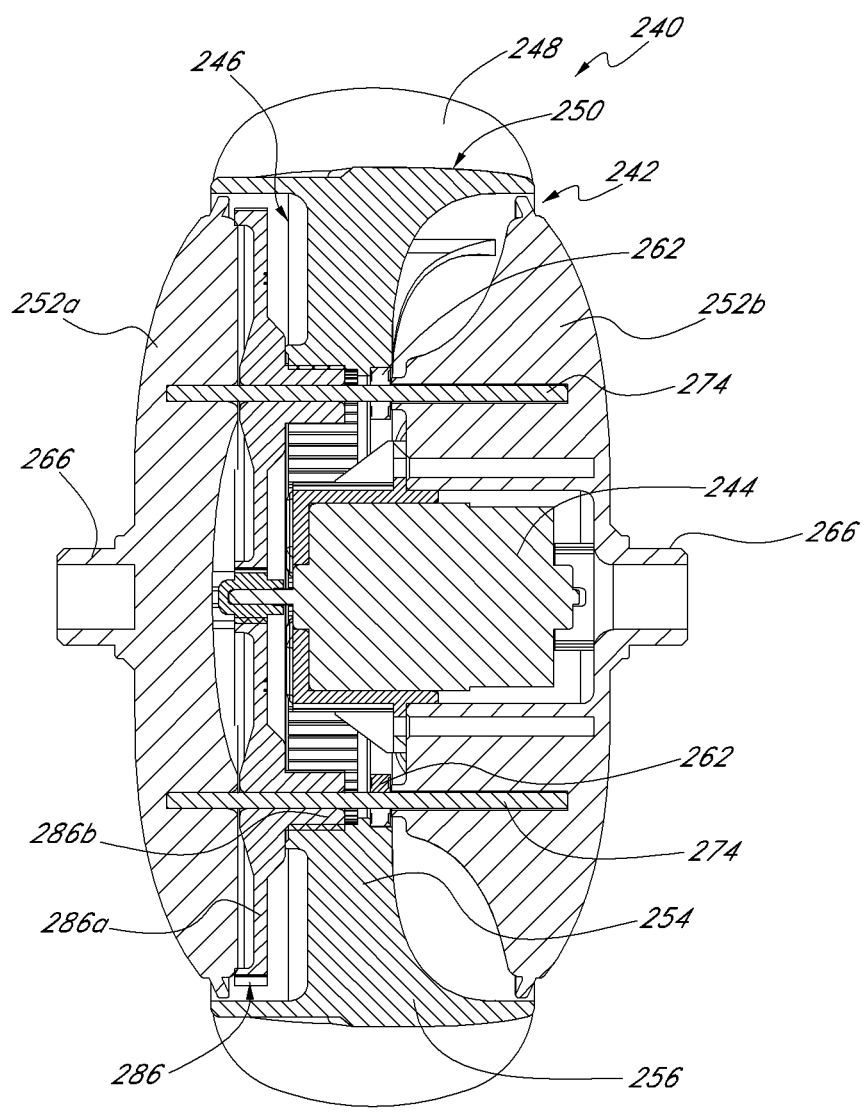
FIG. 12 is a first cross-sectional view of another hub motor arrangement suitable for use with the vehicle of FIGS. 1, 15 and 16.
Figure 13:
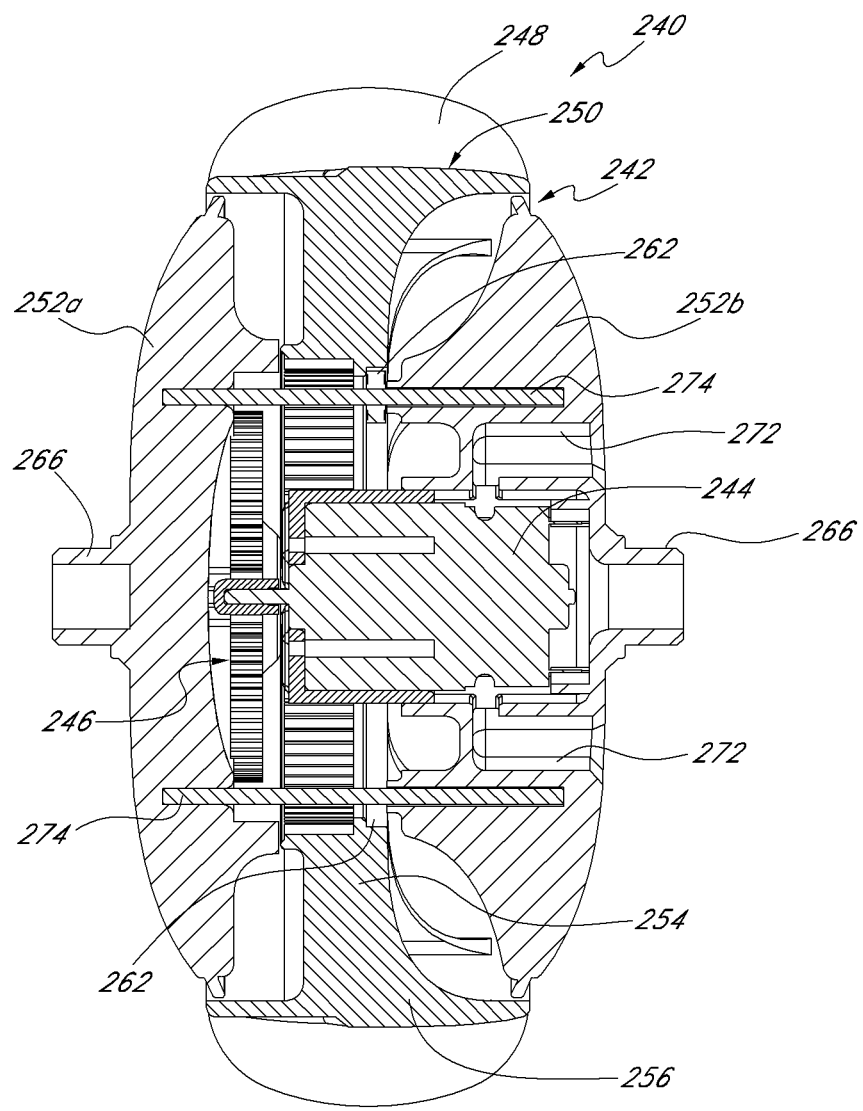
FIG. 13 is a second cross-sectional view of the hub motor arrangement of FIG. 12.
Figure 14:
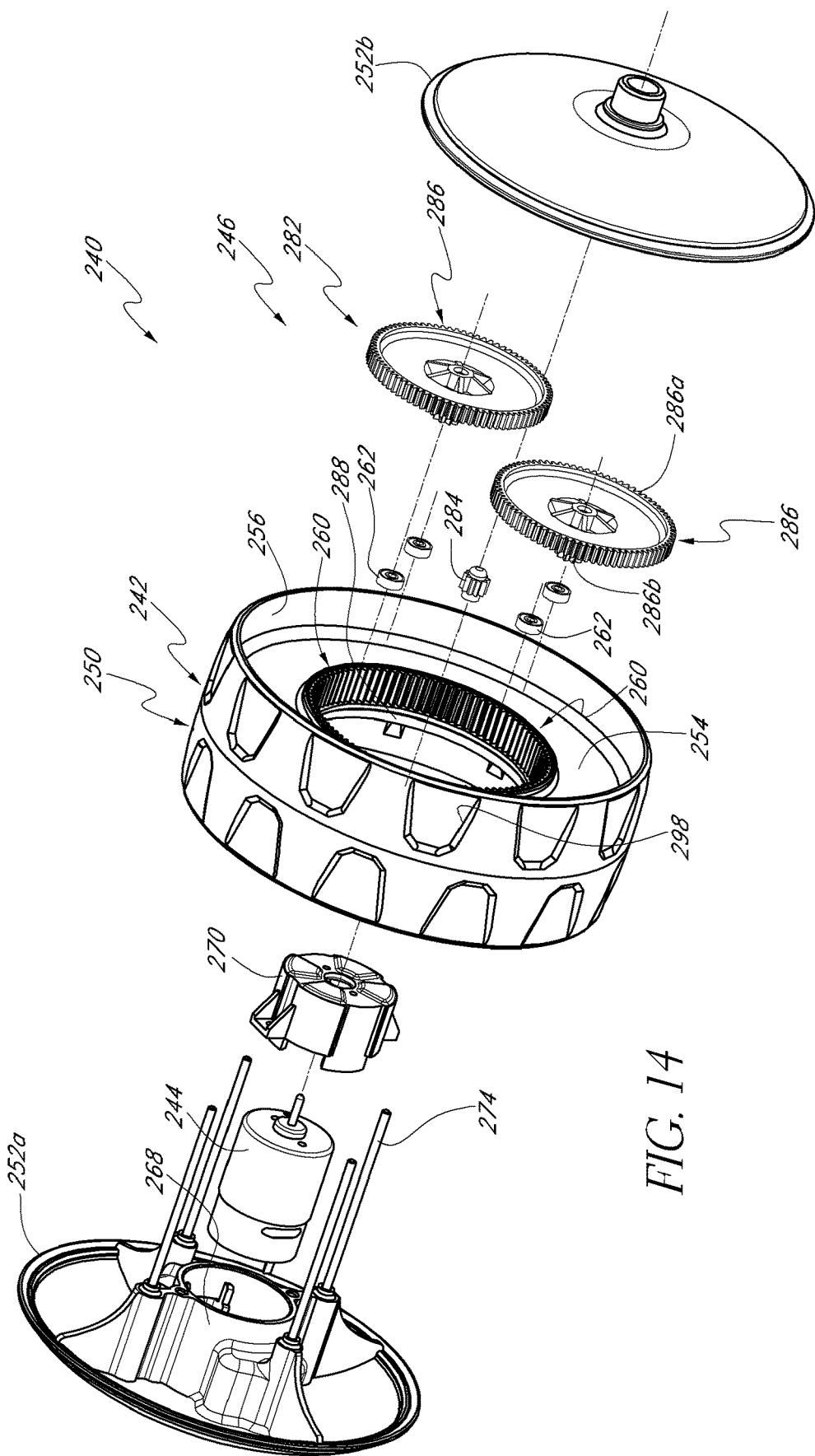
FIG. 14 is a perspective view of the hub motor arrangement of FIG. 12 with components shown in an exploded condition.

Another alternative drive wheel arrangement or hub motor arrangement 240 is illustrated in FIGS. 12-14 and is suitable for similar applications as the hub motor arrangements 40 and 100. Preferably, the hub motor arrangement 240 also makes use of a commercially-available standard DC brush motor. The hub motor arrangement 240 shares similarities with the hub motor arrangements 40 and 100. Accordingly, the disclosure of the hub motor arrangement 240 is focused on the differences relative to the prior arrangements and any details not specifically disclosed can be assumed to be the same as or similar to corresponding features, arrangements or operations of the prior hub motor arrangements 40 and 100. In addition, disclosure regarding any particular one of the hub motor arrangements can generally apply to the other hub motor arrangements unless indicated or apparent otherwise.

The hub motor arrangement 240 includes a body or housing 242, which at least partially encloses a motor 244 and transmission assembly 246. In some configurations, a tire or other traction element 248 that contacts a surface upon which the associated vehicle is ridden is adjacent to or is directly carried by the housing 242. That is, preferably, a diameter of the traction element 248 is similar to but preferably slightly larger than a diameter of the housing 242 and no substantial structural elements (e.g., spokes and rim) are provided between the housing 242 and the traction element 248. Thus, the illustrated hub motor arrangement 240 is well-suited for small diameter wheel applications, such as ride-on vehicles for children. However, in other configurations, the hub motor arrangement 240 is coupled to a traction element (e.g., tire) by one or more structural elements (e.g., spokes and rim) at a diameter that is substantially larger than the diameter of the hub motor arrangement 240.

As described above, preferably, the motor 244 is a standard, commercially-available small DC brush motor. The transmission assembly 246 is configured to convert the speed and torque of the motor 244 into a speed and torque suitable for the drive wheel (housing 242 and traction element 248). In addition, the motor 244 and transmission assembly 246 are configured for accommodation in the housing 242 that is suitably sized and shaped for use as a drive wheel for a small vehicle. In part, this is accomplished by positioning the motor 244 preferably along a center axis of the hub motor arrangement 240 and, in some configurations, offset axially or laterally to one side of a central plane of the hub motor arrangement 240 or of the traction element 248. However, in some configurations, the motor 244 could be off-center and/or spaced from the center axis of the hub motor arrangement 240. Advantageously, with the illustrated arrangement, a standard motor 244 can be used along with a transmission assembly 246 suitable to convert the power of the motor into suitable drive power for the drive wheel arrangement 240 to provide a relatively low-cost drive system for small or child vehicle applications. In addition, such an arrangement preserves space for the transmission of the hub motor arrangement 240.

The illustrated housing 242 comprises a first housing portion, drum or wheel 250, a second housing portion, first side cover or first wheel cap 252a and a third housing portion, second side cover or second wheel cap 252b. Together, the wheel 250 and wheel caps 252a, 252b define an interior space that contains a portion or an entirety of the motor 244 and/or the transmission assembly 246. Preferably, the wheel 250 defines a radial wall portion 254 and an annular end wall portion 256 that carries the traction element 248. In the illustrated arrangement, the radial wall portion 254 is located intermediate the lateral ends of the end wall portion 256 and extends radially inward therefrom to define an opening 260. That is, preferably, the radial wall portion 254 is annular in shape.

Similar to the other hub motor arrangements, the illustrated hub motor arrangement 240 does not include a central axle member that extends entirely through the housing 242. Preferably, when incorporated into an associated vehicle, both sides of the hub motor arrangement 240 are supported; however, preferably load is transferred between the sides by a plurality of connecting shafts 274 instead of by a central axle. In the illustrated arrangement, the plurality of connecting shafts 274 extends between the wheel caps 252a, 252b. Preferably, the plurality (e.g., four) of connecting shafts 274 are located at identical radial positions and spaced at equal angles from one another. In other arrangements, different numbers of connecting shafts 274 can be provided, such as one, two, three, five or more. The connecting shafts 274 can be secured to the wheel caps 252a, 252b by any suitable arrangement. In some configurations, the connecting shafts 274 can be embedded into one of the wheel caps 252a or 252b during the manufacture of the wheel cap 252a or 252b. For example, the wheel cap 252a or 252b can be a molded member (e.g., injection-molded) and can be molded over end portions of the connecting shafts 274. The other wheel cap 252a or 252b can be secured to the connecting shafts 274 by any suitable arrangement, such as via one or more fasteners or a slip-fit, snap-fit or press-fit arrangement, for example. Preferably, the connecting shafts 274 overlap the motor 244 in a lateral or axial direction (along the axis of rotation).

With such an arrangement, the wheel caps 252a, 252b and connecting shafts 274 function as an axle shaft of the hub motor arrangement 240 about which a portion of the housing 242 (e.g., the wheel 250) rotates. Thus, the wheel caps 252a, 252b can be referred to as lateral support members. Preferably, one or more, or each, of the connecting shafts 274 supports a bearing 262 of any suitable arrangement (e.g., cartridge-style ball bearing assembly). The bearings 262, in turn, support the wheel 250 for rotation relative to the wheel caps 252a, 252b and connecting shafts 274. In the illustrated arrangement, the radial wall portion 254 and, in particular, a portion of a surface defining the opening 260 forms a support surface 264 that contacts and rotates upon the bearings 262. Advantageously, with such an arrangement, some or substantially all of the radial loads applied to the wheel 250 are transferred to the wheel caps 252a, 252b and connecting shafts 274 via the bearings 262 to reduce or substantially eliminate radial loading of the transmission 246 for increased efficiency.

Preferably, each of the wheel caps 252a, 252b includes a hub portion or mounting boss 266 that allows the hub motor arrangement 240 to be operatively coupled to an associated vehicle. The mounting bosses 266 extend axially outward from the main body portions of the wheel caps 252a, 252b and can be generally cylindrical in shape. If desired, each mounting boss 266 can include an inner cavity. Thus, the outside or inside surfaces, or both, can be utilized for mounting purposes. In some configurations, the mounting bosses 266 and the main body portions of the wheel caps 252a, 252b are formed as a single piece or unitary structure. However, in other configurations, the mounting bosses 266 could be separate pieces suitably coupled to the main body portions of the wheel caps 252a, 252b.

The illustrated first wheel cap 252a includes an axially-inward-projecting support structure 268, which preferably includes a wall portion that surrounds at least a portion of the motor 244 and defines a pocket that receives the motor 244. Preferably, the support structure 268 extends along a substantial length of the motor 244, such as at least about one-half or about two-thirds of a length of the motor 244. In addition, preferably, a cap 270 is configured to be coupled to the support structure 268 and surround at least a portion of the motor 244. In the illustrated arrangement, the support structure 268 and the cap 270 cooperate to receive and encapsulate the motor 244 within a motor space, with an end of the cap 270 having an opening to permit a drive shaft of the motor 244 to project therethrough. The cap 270 is secured to the support structure 268 or other portion of the first wheel cap 252a by any suitable arrangement, such as a snap-fit or fastener(s). If desired, one or more fasteners can extend through a portion of the cap 270 located adjacent to an end surface of the motor 244 and couple the motor 244 to the cap 270. Preferably, the support structure 268 also includes portions that surround and/or provide axial support to the connecting shafts 274.

The first wheel cap 252a can also include recesses 272 that extend inwardly from an outer surface and include openings (e.g., slots) that pass through the first wheel cap 252a and into a cavity occupied by the motor 244. The openings in the recesses 272 can permit wiring or other control elements to connect to the motor 244 from outside the hub motor arrangement 240. Advantageously, by placing the openings within recesses 272, the opportunity for dirt, debris or other foreign objects to enter the openings is reduced. If desired, seals could be utilized to close off the openings, but allow desired structures (e.g., wires) to pass therethrough. In some configurations, the motor 244 could be completely outside of the housing 242 or, as illustrated, can be completely within the housing 242, depending on factors such as the amount of space available, especially in a width direction (along the center or rotational axis). However, in at least the illustrated arrangement, preferably the motor 244 is replaceable in a cost effective manner in the event of failure, unlike conventional hub motor arrangements having motors that are integrated with the housing or other major structural elements.

Advantageously, as discussed above, the illustrated arrangement is not a through-shaft type of arrangement in which an axle member or arrangement passes completely through the center of the hub motor, but is a distributed axle arrangement that provides suitable support while permitting the motor 244 to be centrally-located or aligned with a central, rotational axis of the hub motor arrangement 40 and to occupy a portion of the axis of rotation. That is, the motor 244 is not a hollow design that surrounds the axis of rotation. Such an arrangement provides a well-balanced hub motor arrangement 240 while permitting the use of a standard, commercially-available "off-the-shelf" motor 244 to keep costs low. In addition, as described herein, one or more of the connecting shafts 274 also support components of the transmission assembly 246, which results in an efficient overall structure that reduces the total number of parts of the hub motor arrangement 240 to keep costs low. Although through-shaft type axle designs can also permit a motor to be aligned with a central, rotational axis of a motor, such an arrangement would require a custom motor design or at least a large motor design because the axle needs to be sufficient to support a substantial portion of the weight of the associated vehicle. In the illustrated arrangement, the shaft of the motor 244 preferably does not support any significant weight of the associated vehicle.

The transmission assembly 246 preferably comprises a planetary gear arrangement 282 that transfers torque from the motor 244 to the wheel 250. In the illustrated arrangement, the planetary gear arrangement 282 includes a sun gear 284, one or more planet gears 286 and a ring gear 288. Preferably, the sun gear 284 is driven by an output shaft of the motor 244. In the illustrated arrangement, the sun gear 284 drives a first gear portion 286a of each of the planet gears 286 and a second gear portion 286b of each of the planet gears 286 drives the ring gear 288. In other arrangements, the planet gears 286 could have a single portion. The portions 286a and 286b of the planet gears 286 are formed by a unitary gear member in the illustrated arrangement; however, in other arrangements, the portions 286a and 286b could be formed by separate components preferably that are coupled for rotation with one another. The planet gears 286 are supported for rotation by a respective one of the connecting shafts 274. In the illustrated arrangement, one or more shafts 274 are structural only and do not carry a planet gear 286. Thus, there could be two, three, four, five or more shafts 274 and planet gears 286 carried by one or any number of shafts 274 less than the entirety of available shafts 274, for example. As illustrated, half (e.g., two) of the shafts 274 carry planet gears 286 and half (e.g., two) do not. Preferably, the planet gears 286 are carried by alternating or opposing shafts 274. In other configurations, there can equal numbers of shafts 274 and planet gears 286.

In the illustrated arrangement, the ring gear 288 is formed by a portion of a surface of the radial wall portion 254 of the wheel 250 that defines the opening 260. However, the ring gear 288 could alternatively be defined by an annular component that is separate from the wheel 250 and connected thereto as an integrated unit or is drivingly coupled thereto (similar to the arrangements 40, 100) to at least partially isolates the ring gear 288 from loads applied to the wheel 250. Preferably, the ring gear 288 surrounds the connecting shafts 274 or, in other words, the connecting shafts 274 pass through the central opening 260 of the annular ring gear 288.

In operation, the motor 244 can be powered by a suitable power source (e.g., a battery) and activated by a suitable user control, such as a throttle pedal, button, paddle or handgrip twist arrangement, for example and without limitation. The motor 244 rotates the sun gear 284, which rotates the planet gears 286. As described, the wheel caps 252*a*, 252*b* and connecting shafts 274 function as an axle assembly of the hub motor arrangement 240 about which a portion of the housing 242 (e.g., the wheel 250) rotates. Thus, the wheel caps 252*a*, 252*b* and connecting shafts 274 can be considered as a stationary carrier for the planet gears 286. Therefore, in the illustrated arrangement, the planet gears 286 rotate about the connecting shafts 274, but otherwise do not rotate as a unit relative to the motor 244. Rather, the rotation of the planet gears 286 drives or causes rotation of the ring gear 288, which, in turn, drives the wheel 250.

One or more of the hub motor arrangements 240 can be used to provide driving power to an associated vehicle. The hub motor arrangement 240 can be driven in a forward direction only, or can have both forward and reverse operations by changing the rotational direction of the motor 244. One-way bearings or clutch mechanisms can be employed to allow driving force in one direction (e.g., forward), while permitting the wheel 250/portion of the housing 242 to rotate faster than it is being driven by the motor 244 (over speed) and/or to permit the wheel 250/portion of the housing 242 to be free-wheeled in a second direction (e.g., reverse). Alternatively, the hub motor arrangement 240 can be configured for forward operation only, with reverse motion requiring the resistance of the motor 244 to be overcome.

The planetary gear arrangement 282 can provide any desired overall gear ratio to convert the torque or power provided by the motor 244 into suitable torque or power for driving the wheel 250/portion of the housing 242 and, thus, the traction element 248 depending on the desired operational speed of the hub motor arrangement 240 and associated vehicle. In the illustrated arrangement, the sun gear 284 is many times smaller (in diameter and/or number of gear teeth) than the first portions 286*a* of the planet gears 286. The second portions 286*b* of the planet gears 286 are many times smaller (in diameter and/or number of gear teeth) than the first portions 286*a* of the planet gears 286. In one arrangement, the sun gear 284 has between about 5-20 teeth (e.g., 10 teeth), the first portions 286*a* of the planet gears 286 have between about 50-100 teeth (e.g., 80 teeth), the second portions 286*b* of the planet gears 286 have between about 5-20 teeth (e.g., 10 teeth) and the ring gear 288 has between about 60-120 teeth (e.g., 90 teeth) or any value or sub-range within the recited ranges. However, in other arrangements, other numbers of gear teeth can be provided for any gear components of the planetary gear arrangement 282. In some configurations, the transmission 246 can have an overall ratio of between about 1:15 to about 1:50 or any value or sub-range of values within this range, such as about 1:30, for example and without limitation.

The components of the hub motor arrangement 240 can be constructed from any suitable material or combinations of materials by any suitable processes. For example, connecting shafts 274 can include or can be made from a metal material, such as steel, which can be (e.g., chrome) plated or otherwise surface treated. Other components or assemblies (e.g., the housing 242 and gears 284, 286) can be constructed from a suitable plastic material by a suitable process (e.g., injection molding). For example, the wheel caps 252*a*, 252*b* and wheel 250 can be constructed from ABS material, the cap 270 can be constructed from polypropylene and the gears 284, 286 can be constructed from POM or nylon. The tire or traction element 248 can be constructed from a suitable rubber or rubber-like material, such as polyurethane, for example. The material of the traction element 248 can be molded directly onto the wheel 250/portion of the housing 242 or can otherwise be suitable coupled to the wheel 250/portion of the housing 242. As illustrated, the outer periphery of the wheel 250/portion of the housing 242 can include an engagement structure 298 that assists in coupling the traction element 248 to the wheel 250/portion of the housing 242. The engagement structure 298 can be a plurality of indents or recesses provided in a spaced configuration to obtain mechanical engagement between the wheel 250/portion of the housing 242 and the traction element 248 to resist separation or relative rotation therebetween. In some arrangements, the traction element 248 can include an interior space that is filled with a gas or other soft material to facilitate deformation of the traction element 248 to conform to irregularities of the surface on which the associated vehicle is operated.

FIGS. 17-23 illustrate a hub motor arrangement that is similar in many respects to the hub motor arrangement 40 of FIGS. 1-6. Accordingly, the same reference numbers are used to indicate the same or similar components. Components or features of the hub motor arrangement 40 of FIGS. 17-23 not specifically described can be the same as or similar to corresponding components or features of the hub motor arrangement 40 of FIGS. 1-6, other hub motor arrangements described herein or can be of any other suitable arrangement. The hub motor arrangement 40 of FIGS. 17-23 is well-suited for use with the vehicle 20 of FIG. 1 or other vehicles.

The hub motor arrangement 40 of FIGS. 17-23 includes a body or housing 42, which at least partially encloses a motor 44 and transmission assembly 46. Preferably, a tire or other traction element 48 that contacts a surface upon which the associated vehicle is ridden is adjacent to or is directly carried by the housing 42. That is, preferably, a diameter of the traction element 48 is similar to but preferably slightly larger than a diameter of the housing 42. Thus, the illustrated hub motor arrangement 40 is well-suited for small diameter wheel applications, such as ride-on vehicles for children. In the illustrated arrangement, a radially compliant member 300 is positioned between the housing 42 and the traction element 48. Thus, the radially compliant member 300 is generally annular in shape. The radially compliant member 300 is configured to transfer rotational force from the housing 42 to the traction element 48, but can compress at least somewhat in a radial direction to accommodate irregularities in the surface upon which an associated vehicle travels and to provide some bump absorption in a manner similar to a pneumatic tire. Preferably, much like a pneumatic tire, the radially compliant member 300 provides a resilient force that limits the radial compression of the traction element 48. The radially compliant member 300 can be the same as or similar to airless tires presently available, such as those marketed by Michelin and Bridgestone, for example.

The radially compliant member 300 can be constructed of a material that is different than the housing 42 or the traction element 48. In some configurations, the radially compliant member 300 is constructed from polyurethane, the housing 42 is constructed from a relatively rigid plastic, such as ABS, and the traction element 48 is constructed from rubber or a rubber-like material. However, any material used for or suitable for use in tires could also be used for the traction element 48. In the illustrated arrangement, the radially compliant member 300 comprises a plurality of generally radially extending elements 302 that can compress or buckle in a radial direction. In some configurations, the elements 302 include two or more sections that are angled with respect to the radial direction. In the illustrated arrangement, the elements 302 include three angled sections with innermost and outermost sections angled in the same direction and free ends thereof connected by a section angled in the opposite direction. When viewed from the side, the elements 302 have a substantially "Z" or "S" shape. In some configurations, the innermost and outermost sections can have the same or substantially the same angle relative to the radial direction. In use, the elements 302 can compress in height to allow for radial compression of the traction element 48. The elements 302 can be the only elements 302 of the radially compliant member 300 or the radially compliant member 300 can include additional elements or structures. The elements 302 can be substantially the same width as the housing 42 and/or traction element 48 or can be narrower that the housing 42 and/or traction element 48. In other configurations, the elements 302 could be wider than the housing 42 and/or traction element 48.

The radially compliant member 300 can comprise an inner connecting portion, which can be an inner connecting ring 304, and an outer connecting portion, which can be an outer connecting ring 306. The inner connecting ring 304 and the outer connecting ring 306 connect the elements 302 with the housing 42 and the traction element 48, respectively. The inner connecting ring 304 and the outer connecting ring 306 can be connected to the housing 42 and the traction element 48, respectively, by any suitable arrangement. In some configurations, the housing 42 and/or traction element 48 can include structures defining one or more undercuts to assist in coupling the radially compliant member 300 to the housing 42 and the traction element 48. The traction element 48 can comprise a plurality of lugs 308 that increase in size extending in a radially inward direction from an inner surface of the traction element 48. The outer connecting ring 306 can engage the lugs 308. The housing 42 comprises a pair of annular grooves 310 on each side. In some configurations, a plurality of passages 312 extends in an axial direction through the housing 42 and can connect the grooves 310. The inner connecting ring 304 can occupy the grooves 310 and a portion or an entirety of the passages 312. The passages 312 can assist in allowing the escape of air or gas bubbles during the molding of the radially-compliant member 300, which can be molded directly onto the housing 42 and/or the traction element 48, such as by an insert molding or over molding process, for example.

As described above, preferably, the motor 44 is a standard, commercially-available small DC brush motor. The transmission assembly 46 is configured to convert the speed and torque of the motor 44 into a speed and torque suitable for the drive wheel (housing 42 and traction element 48). In addition, the motor 44 and transmission assembly 46 are configured for accommodation in the housing 42 that is suitably sized and shaped for use as a drive wheel for a small vehicle. In part, this is accomplished by positioning the motor 44 preferably along a center axis of the hub motor arrangement 40 and offset axially or laterally to one side of a central plane of the hub motor arrangement 40 or of the traction element 48. However, in some configurations, the motor 44 could be off-center and/or spaced from the center axis of the hub motor arrangement 40. Preferably, the motor 44 is surrounded by one or both of a support bearing for the housing 42 and a mount of the hub motor arrangement 40. In the illustrated arrangement, a portion of the motor 44 is laterally or axially inboard of the support bearing and/or mount that is nearest the motor 44 (if multiple bearings/mounts are provided) and a portion of the motor 44 is laterally or axially outboard of the support bearing and/or mount. Advantageously, with such an arrangement, a standard motor 44 can be used along with a transmission assembly 46 suitable to convert the power of the motor into suitable drive power for the drive wheel arrangement 40 to provide a relatively low-cost drive system for small or child vehicle applications. In addition, such an arrangement preserves space for the transmission of the hub motor arrangement 40.

The illustrated housing 42 comprises a first housing portion or drum 50 and a second housing portion or cover 52. Together, the drum 50 and cover 52 define an interior space that contains the transmission assembly 46 and accommodates at least a portion of the motor 44. Preferably, the drum 50 defines a sidewall portion 54 and an annular end wall portion 56 that carries the traction element 48. The cover 52 is securable to the end of the annular end wall portion 56 opposite the sidewall portion 54 by a suitable arrangement (e.g., one or more fasteners) and defines a second sidewall portion of the housing 42. As discussed below, the housing 42 may also include an interconnecting arrangement 400 to provide additional support to the housing 42 and better transfer the load of the motor 44.

The illustrated hub motor arrangement 40 also includes an axle shaft 60 (also referred to simply as the "axle") that, preferably, and in the illustrated arrangement, does not extend entirely through the housing 42, but is an interrupted axle arrangement in which the axle 60 extends only partially through the housing 42 in the axial direction. The axle 60 preferably defines an axis of rotation for the housing 42. The axle 60 can be a metal shaft, or can be another suitable structure. For example, the housing 42 could have left-right symmetry and the axle 60 could be substantially larger in diameter than illustrated. Thus, the term "axle" is a broad term used with its ordinary meaning, which can include structures for rotatably supporting another object. In some configurations, the axle 60 may be formed integral with the first lateral support member 62.

Preferably, when incorporated into an associated vehicle, both sides of the hub motor arrangement 40 are supported; however, the axle 60 supports only one side of the hub motor arrangement 40. A first lateral support member 62 is supported by an inboard end of the axle 60. A second lateral support member 68 also includes a central boss or hub portion 70 and a vertically-oriented plate portion 72 located on a laterally-inward end of the hub portion 70. Thus, the plate portion of the first lateral support member 62 faces the plate portion of the second lateral support member 68 with the respective hub portions extending away from one another in a lateral direction. A space is provided between the first lateral support member 62 and the second lateral support member 68, which space accommodates one or more components of the transmission assembly 46. As discussed in greater detail below, the interconnecting arrangement 400 provides additional support and better transfers the load of the motor 44 through an arrangement of interconnecting recesses and protrusions that are located between one or more components of the transmission assembly 46 as shown in FIGS. 17-20 and discussed in greater detail below.

As illustrated in FIGS. 17-20, the first lateral support member 62 and the second lateral support member 68 can be connected by a plurality (e.g., two) of connecting shafts 74 that preferably are located at identical radial positions. In other arrangements, different numbers of connecting shafts 74 can be provided, such as one, three, five or more. The connecting shafts 74 can be secured to the support members 62 and 68 by any suitable arrangement. In the illustrated configuration, the connecting shafts 74 are embedded into one of the support members 62 and 68 (i.e., the second lateral support member 68) during the manufacture of the support member 62 or 68. For example, the second lateral support member 68 can be a molded member (e.g., injection-molded) and can be molded over end portions of the connecting shafts 74. The other support member 62 or 68 can be secured to the connecting shafts 74 by any suitable arrangement, such as via one or more fasteners or a snap-fit or press-fit arrangement, for example. Preferably, the connecting shafts 74 overlap one or both of the motor 44 and the axle 60 in a lateral or axial direction (along the axis of rotation). Instead of or in addition to the connecting shafts 74, the interconnecting arrangement 400 may be provided on either side of the transmission assembly 46 to better distribute the load across the hub assembly. The interconnecting protrusions and recesses of the interconnecting arrangement 400 allow for additional support beyond the support provided by the connecting shafts 74, specifically in the area of the housing not occupied by the transmission assembly 46. Additional details regarding the interconnecting assembly 400 are discussed below.

As in the embodiment shown in FIGS. 1-6, the hub portion of the second lateral support member 68 can surround at least a portion of the motor 44. Preferably, the hub portion of the second lateral support member 68 extends along a substantial length of the motor 44, such as at least about one-half or at least about two-thirds of a length of the motor 44. In addition, preferably, the motor 44 is secured to the second lateral support member 68 by a suitable arrangement, such as one or more fasteners, which extend through a portion of the plate portion of the second lateral support member 68 located adjacent to an end surface of the motor 44. A cover 77 can cover a laterally outboard portion of the motor 44 and can be used to secure at least one side of the hub motor arrangement 40 to a vehicle. For example, the cover 77 can include a mounting plate portion that can be vertically-oriented (perpendicular to the axis of rotation). The cover 77 can also include features to help keep the motor 44 cool, such as cooling fins and or vent openings, for example. In some configurations, the motor 44 can transfer load from the cover 77 to the hub portion of the second lateral support member 68.

Preferably, one or both of the hub portion of the first lateral support member 62 and the hub portion of the second lateral support member 68 extends from within the housing 42 to outside of the housing 42. Similar to the embodiment illustrated in FIG. 4, a first bearing 78 can be interposed between the housing 42 (the drum or first housing portion 50) and the hub portion 64 of the first lateral support member 62 and a second bearing 80 can be interposed between the housing 42 (the cover or second housing portion 52) and the hub portion 70 of the second lateral support member 68. With such an arrangement, the axle 60, first lateral support member 62, connecting shafts 74 and the second lateral support member 68 function as an axle shaft of the hub motor arrangement 40 about which the housing 42 rotates on the bearings 78 and 80. In some configurations, the motor 44 could be completely outside of the housing 42 (e.g., outside bearing 80) or completely within the housing 42, depending on factors such as the amount of space available, especially in a width direction (along the center or rotational axis). However, in at least the illustrated arrangement, preferably the motor 44 is reasonably accessible without significant disassembly of the hub motor arrangement 40. Such an arrangement allows the motor 44 to be replaced in a cost effective manner in the event of failure, unlike conventional hub motors that utilize motors that are integrated with the housing and other major structural elements.

Advantageously, the illustrated arrangement is not a through-shaft type of arrangement in which an axle member or arrangement passes completely through the center of the hub motor, but is a distributed axle arrangement that provides suitable support while permitting the motor 44 to be centrally-located or aligned with a central, rotational axis of the hub motor arrangement 40 and to occupy a portion of the axis of rotation. That is, the motor 44 is not a hollow design that surrounds the axis of rotation. Such an arrangement provides a well-balanced hub motor arrangement 40 while permitting the use of a standard, commercially-available "off-the-shelf" motor 44 to keep costs low. In addition, as described herein, one or more of the first lateral support member 62, connecting shafts 74 and the second lateral support member 68 are also components of the transmission assembly, which results in an efficient overall structure that reduces the total number of parts of the hub motor arrangement 40 to keep costs low. Although through-shaft type axle designs can also permit a motor to be aligned with a central, rotational axis of a motor, such an arrangement would require a custom motor design or at least a large motor design because the axle needs to be sufficient to support a substantial portion of the weight of the associated vehicle. In the illustrated arrangement, the shaft of the motor 44 preferably does not support any significant weight of the associated vehicle.

Similar to the illustrated arrangement shown in FIGS. 1-6, this arrangement can have a first bearing 78 and the second bearing 80 that have different diameters. The first bearing 78 can surround the axle 60 and the hub portion 64 of the first lateral support member 62. The second bearing 80 is larger than the first bearing 78 and can surround the motor 44 and the hub portion 70 of the second lateral support member 68. In addition, in at least some configurations, the hub motor arrangement 40 is mounted to an associated vehicle at a mount location L such that the mounting portion of the vehicle surrounds the motor 44. The mount location L preferably is outboard of the second bearing 80 and may be axially aligned with a portion of the hub portion of the second lateral support member 68 such that the mounting portion of the vehicle is directly or indirectly supported on the hub portion of the second lateral support member 68. A second mount location L is provided by a portion of the axle 60 outboard of the hub portion of the first lateral support member 62. Such an arrangement allows the width of the housing 42 to be reduced or minimized, which is advantageous for vehicles with limited space in a width direction, such as two-wheeled scooters for example and without limitation. That is, if the mount location L surrounds the motor 44, the space for the hub motor arrangement 40 does not have to accommodate the entire width (or, in the illustrated arrangement, the axial length) of the motor 44. Moreover, the direct drive arrangement of the hub motor arrangement 40 allows the chain drive arrangement of prior electric scooters to be omitted, which saves significant weight and cost.

The transmission assembly preferably comprises a planetary gear arrangement that transfers torque from the motor 44 to the housing 42. In the illustrated arrangement, the planetary gear arrangement includes a sun gear 84, two planet gears 86 and a ring gear 88. Preferably, the sun gear 84 is driven by an output shaft of the motor 44. In the illustrated arrangement, the planet gears 86 are double spur gears configured such that the sun gear 84 drives a first gear portion 86a of each of the planet gears 86 and a second gear portion 86b of each of the planet gears 86 drives the ring gear 88. In other arrangements, the planet gears 86 could have a single portion. The portions 86a and 86b of the planet gears 86 are formed by a unitary gear member in the illustrated arrangement; however, in other arrangements, the portions 86a and 86b could be formed by separate components preferably that are coupled for rotation with one another. The planet gears 86 are supported for rotation by a respective one of the connecting shafts 74. In the illustrated arrangement, there are equal numbers of shafts 74 and planet gears 86. However, in other configurations, one or more shafts 74 could be structural only and not carry a planet gear 86. Thus, there could be two, three, four, five or more shafts 74 and planet gears 86 carried by one or any number of additional shafts 74 less than the entirety of available shafts 74, for example. In some embodiments there could be more than two planet gears 86.

In the illustrated arrangement, the ring gear 88 is an annular component that is separate from the first and second housing portions 50, 52. Such an arrangement at least partially isolates the ring gear 88 from loads applied to the housing 48, which can be advantageous for higher load applications (e.g., larger vehicles). However, in alternative arrangements, the ring gear 88 could be integrated with the one or more portions of the housing 42 (e.g., portions 50 and/or 52), such as for lower load applications (e.g., smaller vehicles). Preferably, the ring gear 88 surrounds the connecting shafts 74 or, in other words, the connecting shafts 74 pass through the central opening of the annular ring gear 88. An inner surface of the annular ring gear 88 defines a gear portion 88a (e.g., gear teeth) of the ring gear 88. An outer surface of the ring gear 88 defines a plurality of drive protrusions 90 that define recesses 92 in between. In some configurations, the ring gear 88 interlocks and is supported by the housing 42. In these configurations, the ring gear 88 is a separate piece from the housing 42 to allow for better tolerances between the ring gear 88 and the housing 42 during higher load applications. The ring gear 88 can be formed from a low friction material including polyoxymethylene to allow the ring gear 88 to rotate with lower friction between the ring gear 88 and the housing 42.

Similarly, the drum portion or first housing portion 50 of the housing 42 can have an inner surface that defines a plurality of drive protrusions 94 with recesses 96 in between. Preferably, the recesses 92 and 96 of the ring gear 88 and the housing 42, respectively, are sized and shaped to accommodate the drive protrusions 94 and 90 of the housing 42 and the ring gear 88. In some arrangements, the drive protrusions 90 and 94 (and recesses 92 and 96) can have substantially the same size and shape or complementary sizes and shapes. Preferably, the drive protrusions 90 and 94 are fairly large (as compared to gear teeth) to ease manufacturing and assembly. For example, in one arrangement, eight protrusions 90 and 94 can be provided on each of the ring gear 88 and the housing 42 and the protrusions 90 of the ring gear 88 have a smaller radial dimension than the protrusions 94 of the housing 42. Thus, the ring gear 88 can transfer rotational motion from the planetary gear arrangement 82 to the housing 42.

In some configurations, hub motor assembly includes an engagement or interconnecting arrangement that provides additional support and rigidity to the assembly. Preferably, the interconnecting arrangement 400 utilizes the space within the housing 42 that is not blocked or occupied by the planetary gears for engagement between the two sides of the housing 42. The interconnecting arrangement 400 may be formed integrally with the two members 50, 52, of the housing 42 or may be separate pieces operably coupled to the housing or other portions of the assembly. The interconnecting arrangement 400 includes at least one first interconnecting member 410 that, along with the cover 77 and the cover 52 of the housing 42, can be used to secure at least one side of the hub motor arrangement 40 to a vehicle. For example, the first interconnecting member 410 can be formed integrally with the cover 52 of the housing 42. In some configurations, the motor 44 can transfer load from the first interconnecting member 410 to the second lateral support member 68. As illustrated, the first interconnecting member 410 includes portions that occupy the space outside the planet gears 86 to provide additional support and stability to the motor 44. The first interconnecting member 410 can be circular and can extend around the diameter of the housing 42. Preferably, the first interconnecting member 410 is sized so that its outer diameter is smaller than the inner diameter of the ring gear 88.

Figure 18:
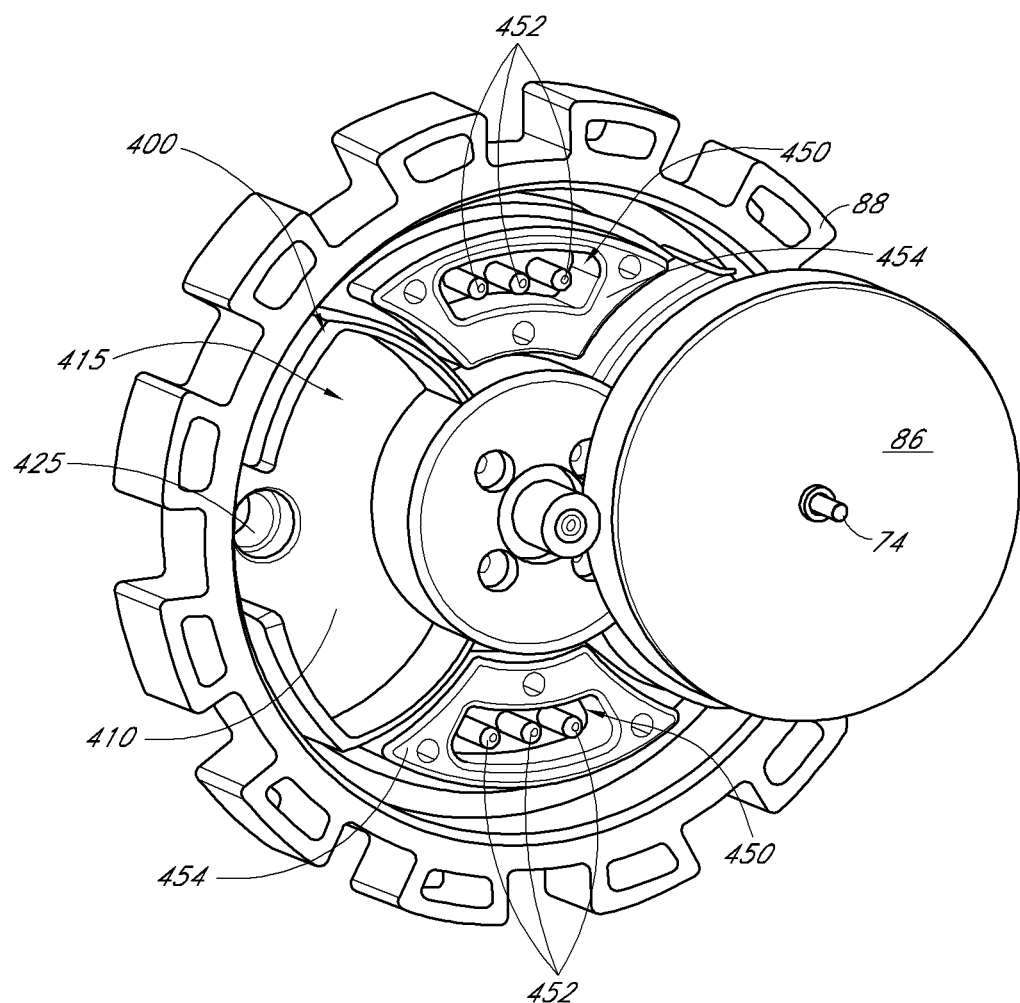
FIG. 18 is a perspective view of a second side of the hub motor arrangement of FIG. 17.
Figure 19A:
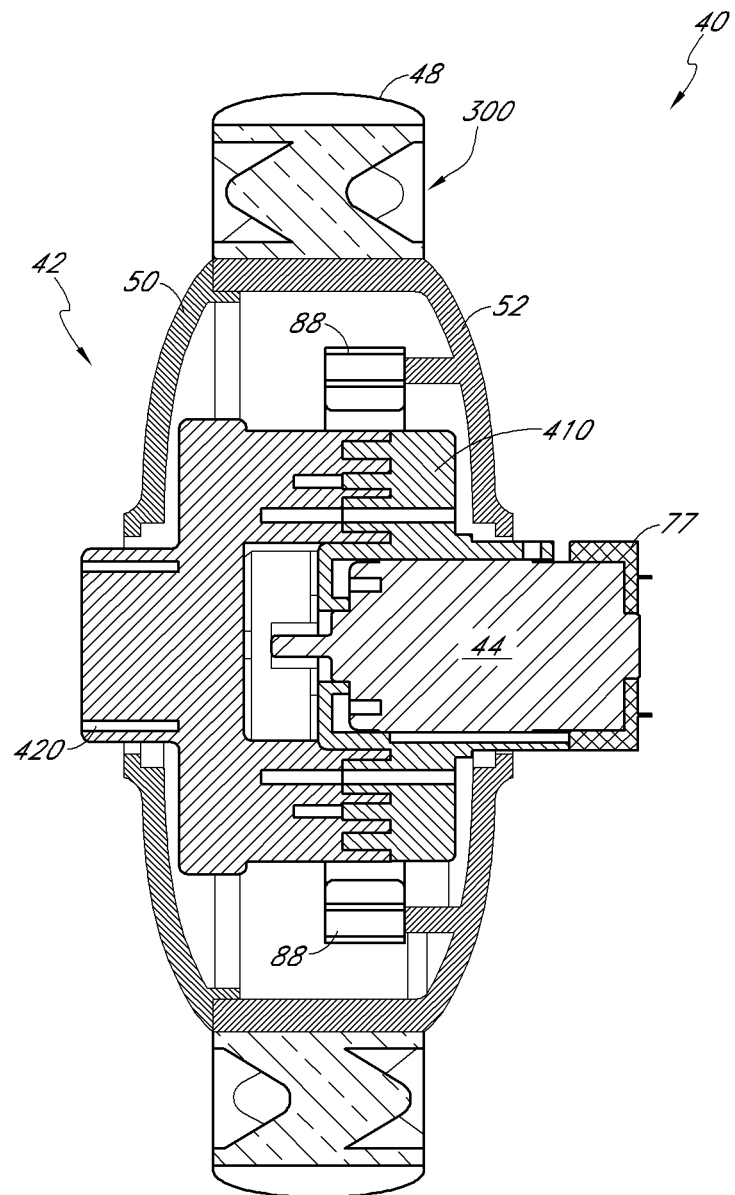
FIG. 19A is a first cross-sectional view of the hub motor arrangement of FIG. 17.
Figure 19B:
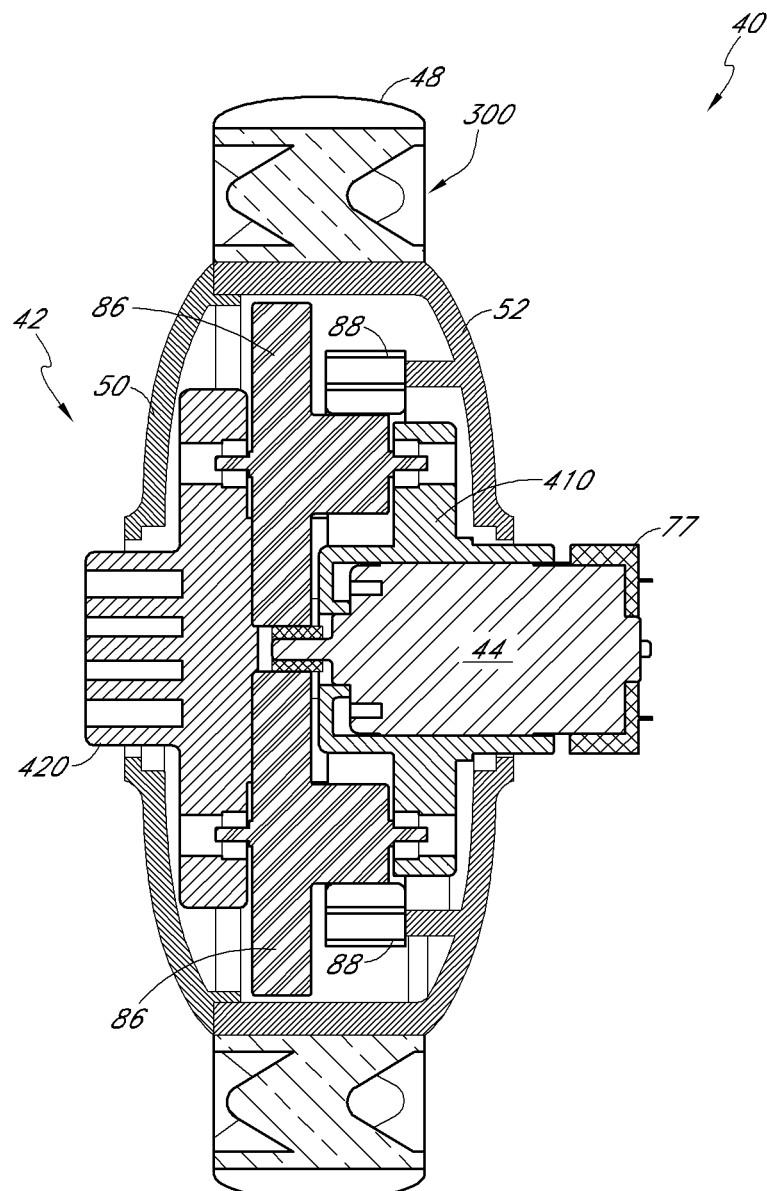
FIG. 19B is a second cross-sectional view of the hub motor arrangement of FIG. 17.
Figure 20:
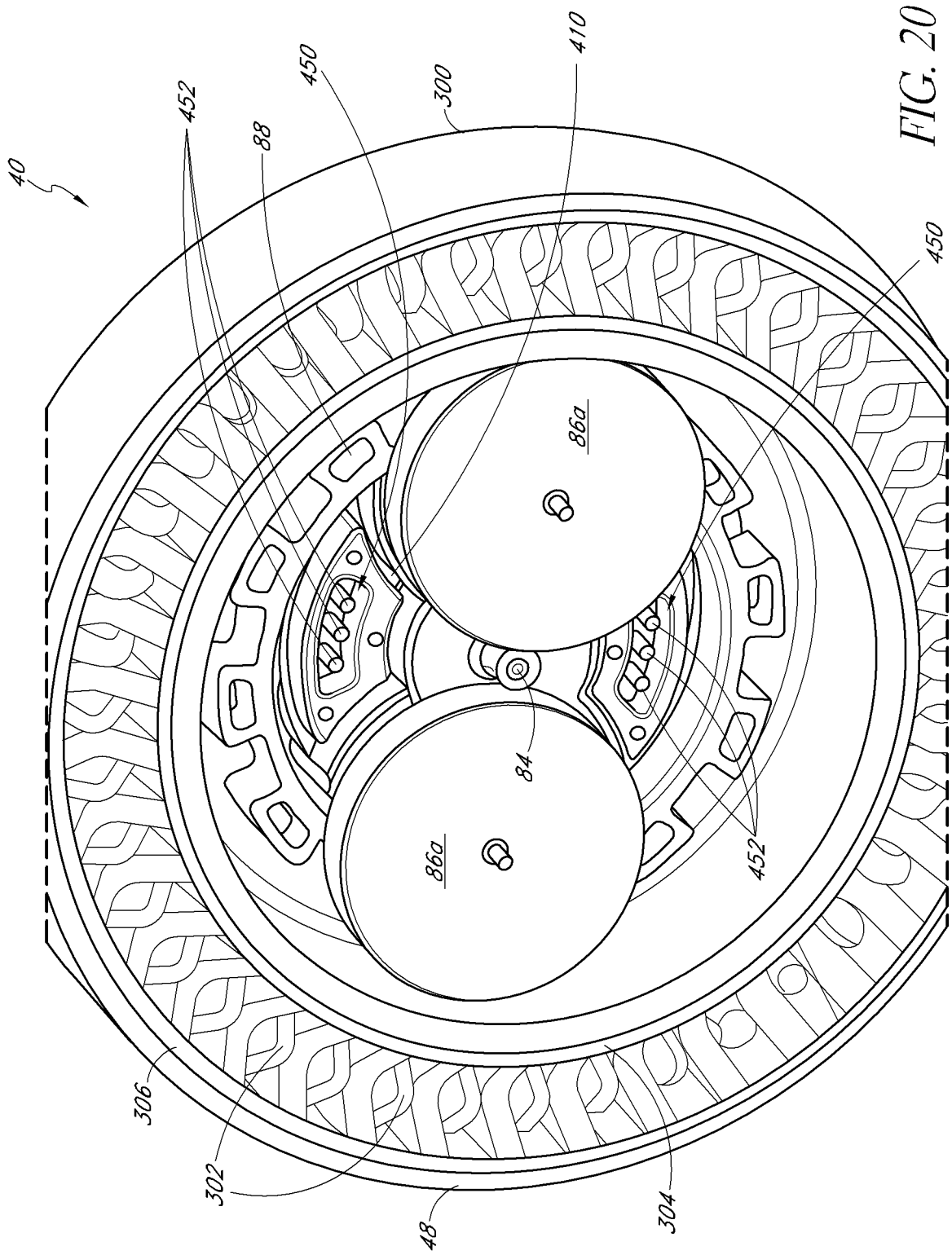
FIG. 20 is another perspective view of the hub motor arrangement shown in FIG. 17.

The first interconnecting member 410 includes openings 425 to allow the connecting shafts 74 to pass through the interconnecting member 410. The interconnecting member 410 also includes recesses that can receive portions of the planet gears 86 and allow rotation of the planet gears 86. One recess 415 is illustrated, though a second recess 415 is located behind the illustrated planet gear 86. In addition, the first interconnecting member 410 also includes a plurality of recesses and protrusions that fit within the space outside of the outer circumference of the planet gears 86 to provide additional stability to the hub motor arrangement. As illustrated, a wedge-shaped protrusion 454 extends axially from the surface of the first interconnecting member 410. Two protrusions 454 are shown in FIG. 18, occupying the space outside of the two planet gears 86. The protrusion 454 includes a recess 450 in which are disposed a plurality of protrusions 452. As illustrated, each recess 450 can include multiple smaller protrusions 452 that extend axially and are spaced apart. In the illustrated embodiment, there are three protrusions 452 per recess 450; however, other configurations may have one, two, four, or more protrusions within each recess. Each larger protrusion 454 can also include additional recesses that provide additional engagement with a second interconnecting member 420 and can assist in alignment of the interconnecting members. Preferably, the protrusions 454 and 452 and recesses 450 occupy the majority of, if not nearly the entirety of the unoccupied axial space outside of the planet gears 86 so that the added support and benefits can be maximized. In some embodiments, the protrusions and recesses of the interconnecting members can include fastening members such as clips, screws, press-fit members, or other fastening devices. The first interconnecting member 410 may be formed integral with the housing 42 or may be separately formed.

Figure 17:
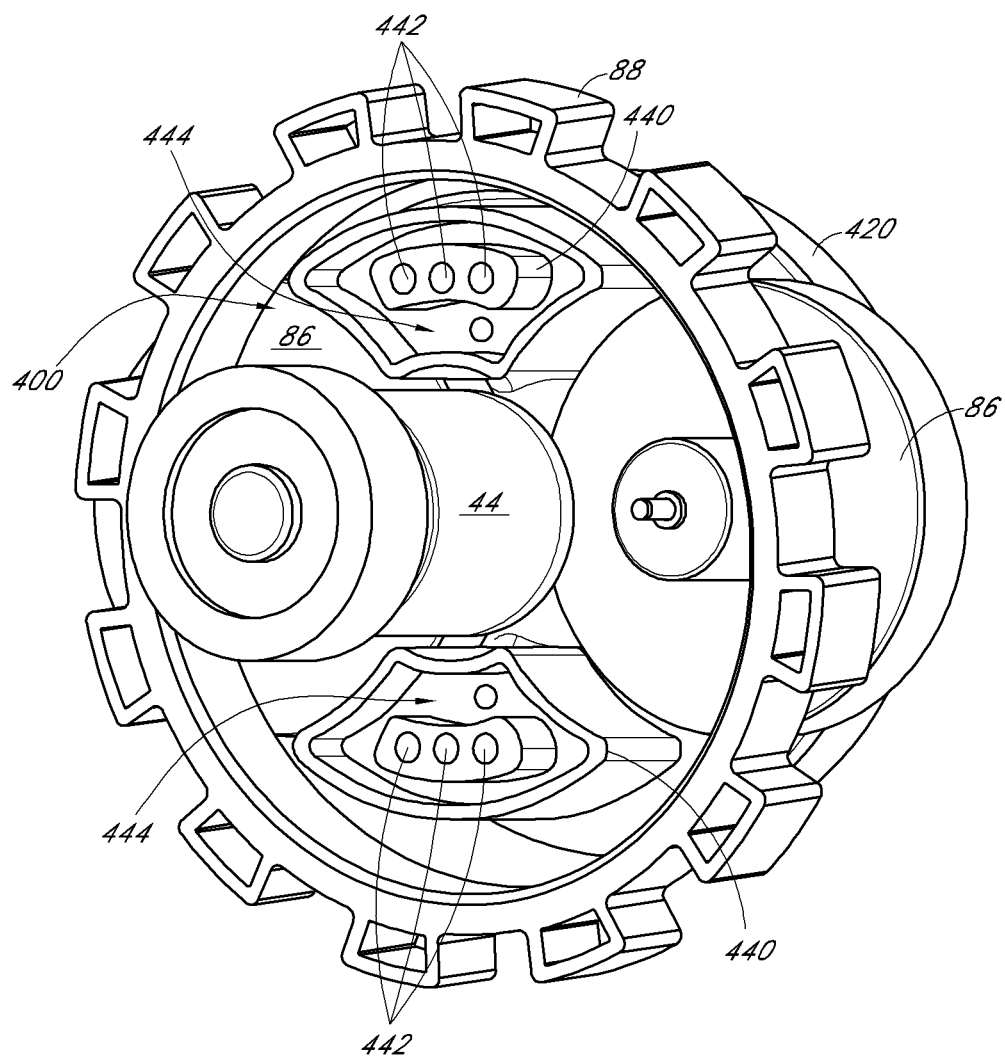
FIG. 17 is a perspective view of a first side of another hub motor arrangement suitable for use with the vehicle of FIGS. 1, 15, and 16.
Figure 21:
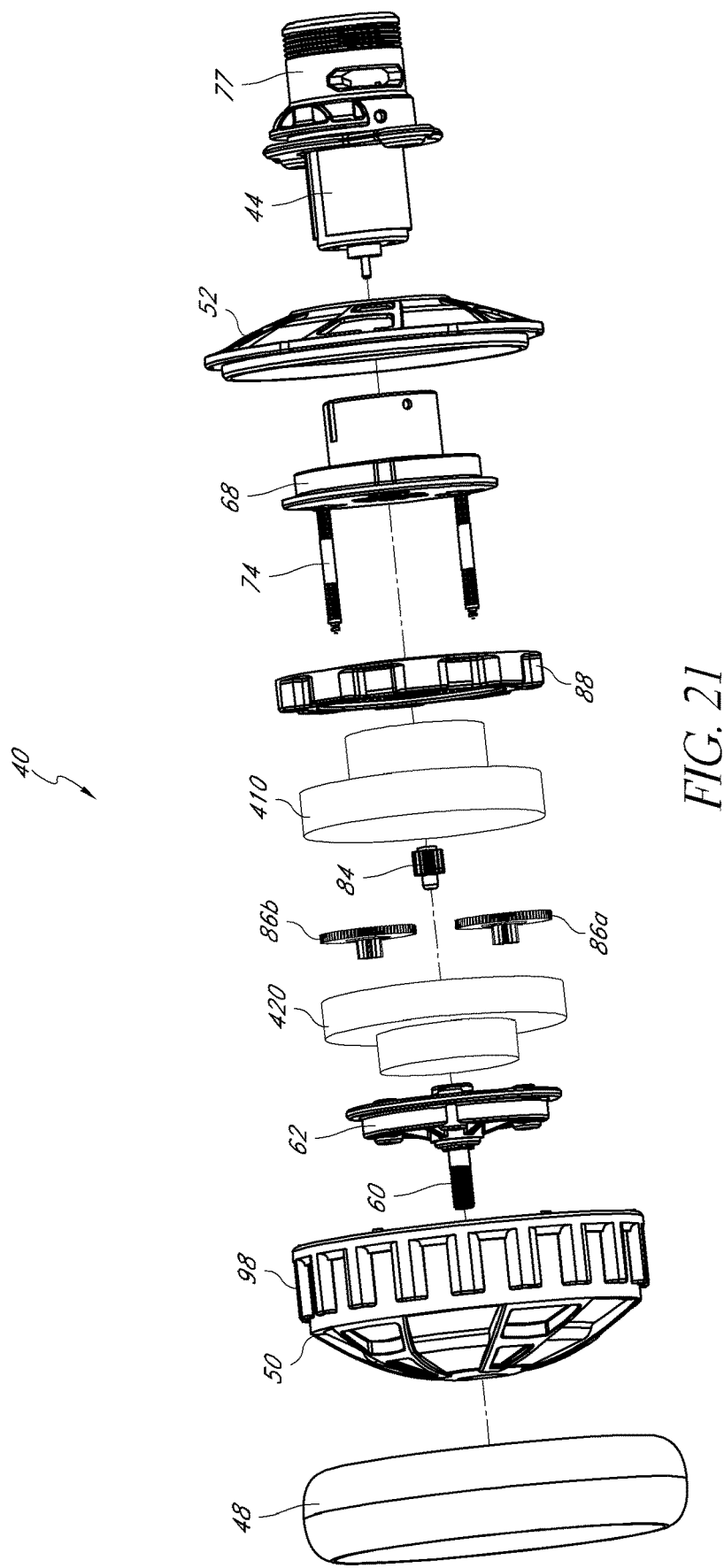
FIG. 21 is an exploded view of the hub motor arrangement shown in FIG. 17.
Figure 22:
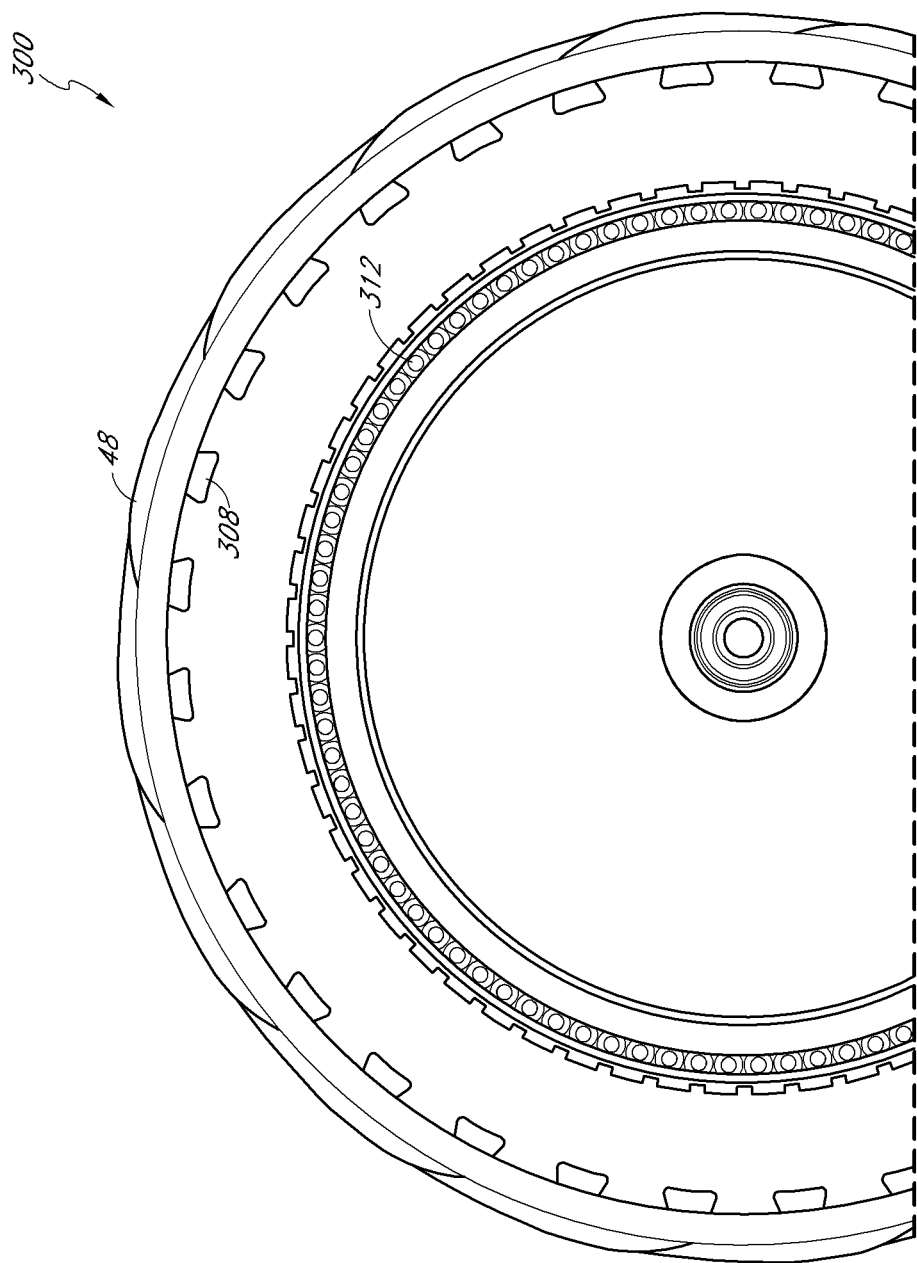
FIG. 22 is a partial front view of a traction component for a hub motor arrangement such as the arrangement shown in FIG. 17.
Figure 23:
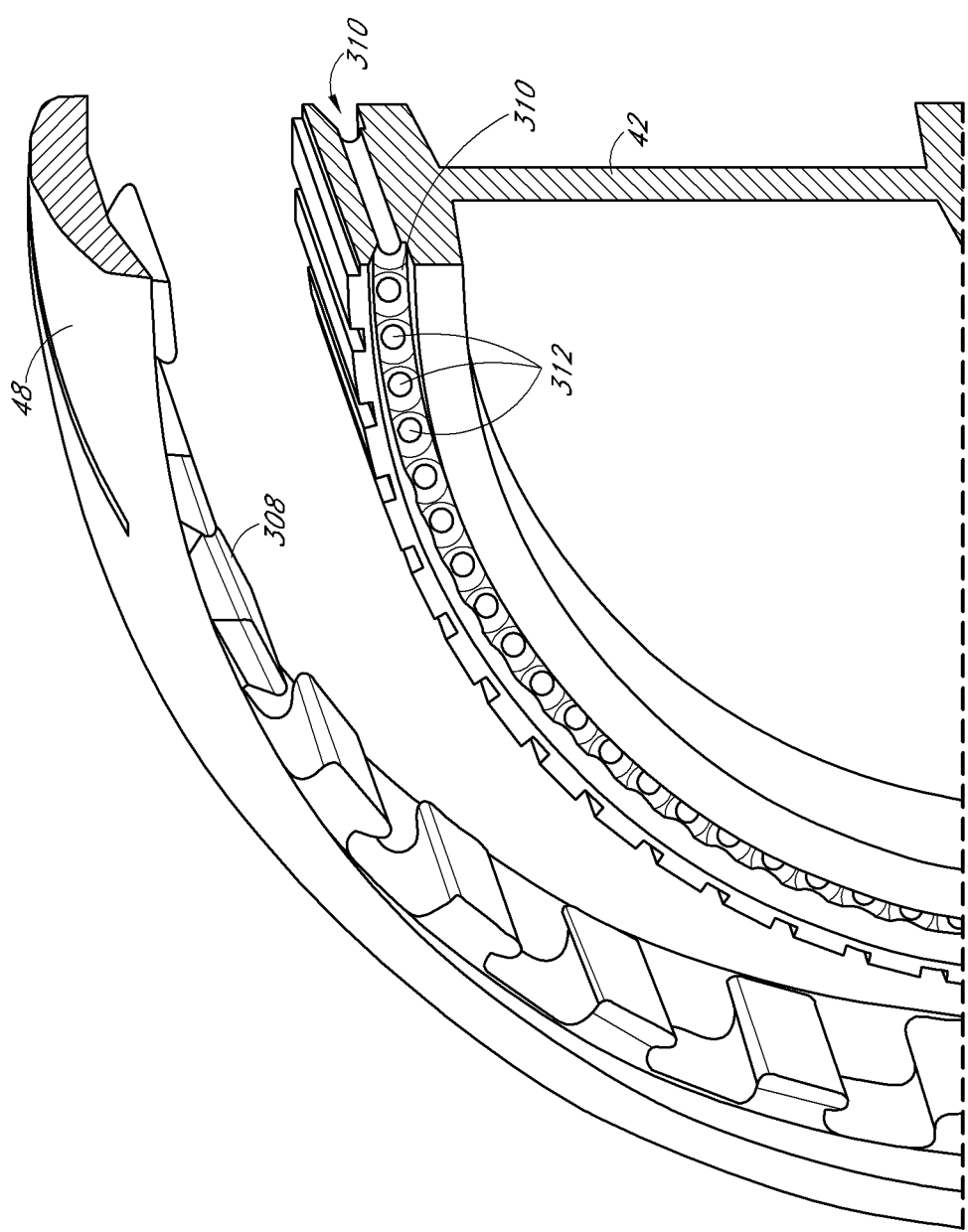
FIG. 23 is a partial perspective view of a traction component for a hub motor arrangement such as the arrangement shown in FIG. 17.

The interconnecting arrangement 400 also includes a second interconnecting member 420. Preferably, the second interconnecting member 420 is configured to engage the first interconnecting member 410 through the ring gear 88 and with the planet gears 86 between the first and second interconnecting members 420 and 410. Preferably, the second interconnecting member 420 includes protrusions and recesses that correspond to those of the first interconnecting member 410 so that the protrusions on the first member 410 can be received in the recesses on the second member 420 and vis versa. In this manner, the first and second interconnecting members 420 and 410 can securely engage one another and resist transverse movement relative to one another. For example, as illustrated in FIGS. 17 and 18, the first and second interconnecting members 410 and 420 can engage one another in a space that is located between the planet gears 86 in a circumferential direction. For example, as illustrated, the second interconnecting member 420 includes a wedge-shaped recess 444 at a location that corresponds to the space outside the planet gears 86. The recess 444 can be defined by an outer protrusion or extending member. The recess 444 includes a protrusion 440 that includes a plurality of recesses 442. The recess 444, protrusion 440 and plurality of recesses 442 of the second interconnecting member 420 are configured to mate with the wedge 454, recess 450, and plurality of protrusions 452 of the first interconnecting member 410. The protrusions 452 can be received within the recesses 442 when the first and second interconnecting members 410 and 420 are pressed together. In other embodiments, the recess 444 can include multiple protrusions and the multiple protrusions can include one or more recesses. In yet other embodiments, the protrusion 440 can include a single recess or can include 2, 3, 4, 5 or more recesses for receiving protrusions on the first interconnecting member 410. The second interconnecting member 420 may be formed integral with the cover 50 of the housing 42 or may be separate piece with its outer diameter smaller than the inner diameter defined by the ring gear 88. Two recesses 444 are shown in FIG. 17, occupying the space between the two planet gears 86, but in other embodiments there can be just one recess 444 or more than two recesses 444. The exploded view of a hub motor arrangement shown in FIG. 21 illustrates schematic representations of the first interconnecting member 410 and the second interconnecting member 420 illustrating where the first and second interconnecting members could fit within embodiments of a hub motor arrangement such as those shown in FIGS. 17-20.

Figure 5:
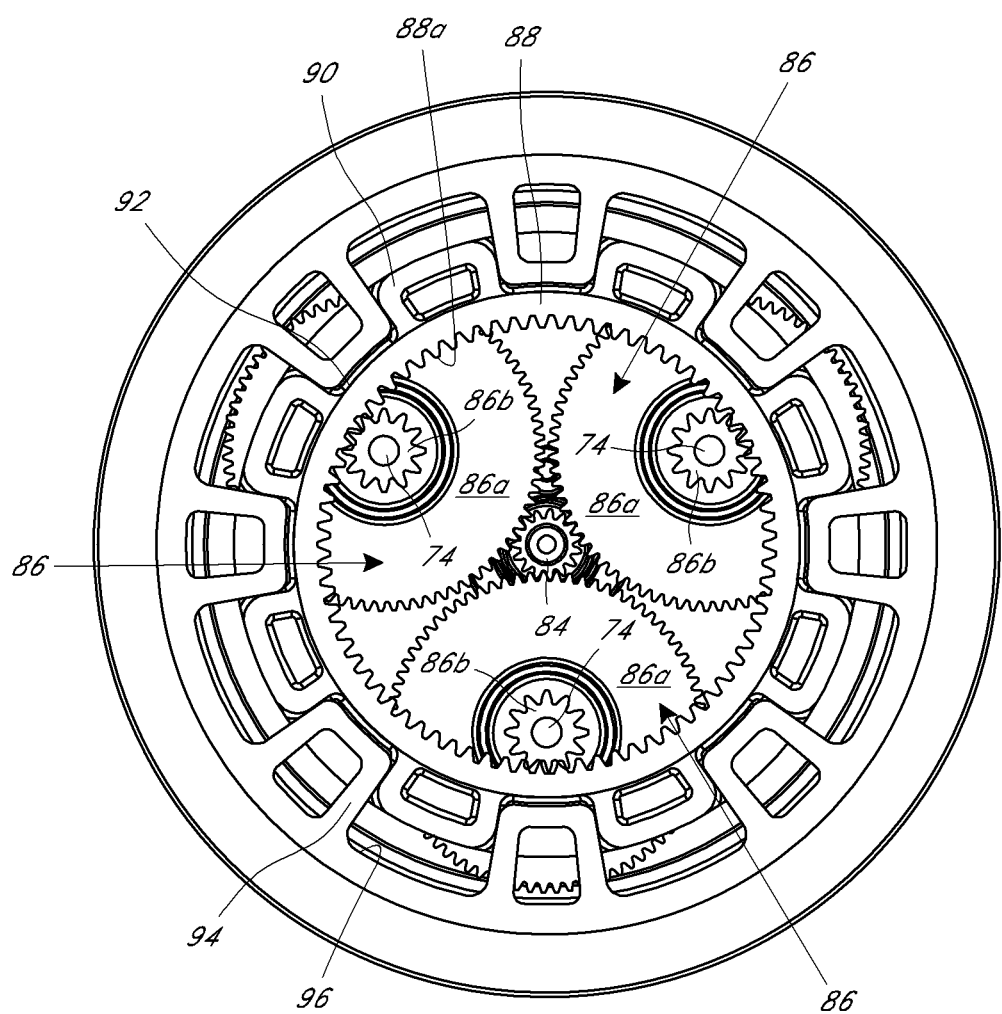
FIG. 5 is a sectional view of the hub motor arrangement of FIG. 2 taken along a plane that extends vertically and perpendicular to the axis of rotation of the hub motor arrangement.
Figure 6:
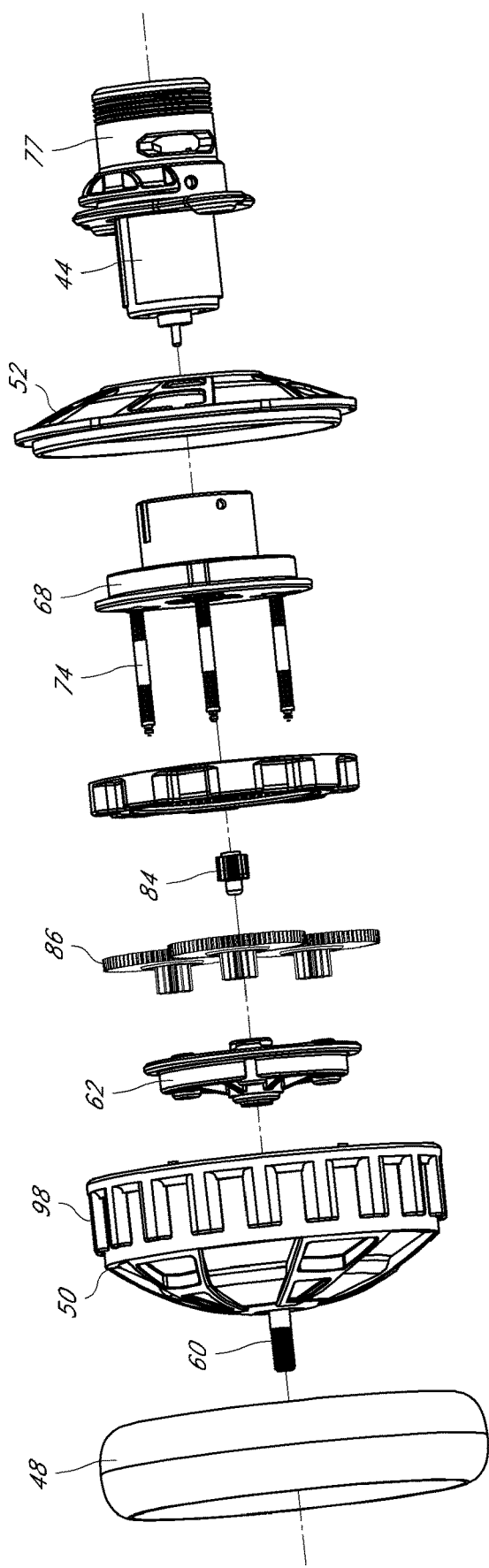
FIG. 6 is perspective view of the hub motor arrangement of FIG. 2 with components shown in an exploded condition.

Also, similar to the embodiment illustrated in FIG. 5, the drum portion or first housing portion 50 of the housing 42 can have an inner surface that defines a plurality of drive protrusions 94 with recesses 96 in between. Preferably, the recesses 92 and 96 of the ring gear 88 and the housing 42, respectively, are sized and shaped to accommodate the drive protrusions 94 and 90 of the housing 42 and the ring gear 88. In some arrangements, the drive protrusions 90 and 94 (and recesses 92 and 96) can have substantially the same size and shape or complementary sizes and shapes. Preferably, the drive protrusions 90 and 94 are fairly large (as compared to gear teeth) to ease manufacturing and assembly. For example, in one arrangement, eight protrusions 90 and 94 can be provided on each of the ring gear 88 and the housing 42 and the protrusions 90 of the ring gear 88 have a smaller radial dimension than the protrusions 94 of the housing 42. Thus, the ring gear 88 can transfer rotational motion from the planetary gear arrangement 82 to the housing 42.

In operation, the motor 44 can be powered by a suitable power source (e.g., a battery) and activated by a suitable user control, such as a throttle pedal, button, paddle or handgrip twist arrangement, for example and without limitation. The motor 44 rotates the sun gear 84, which rotates the planet gears 86. As described, the first lateral support member 62, connecting shafts 74 and the second lateral support member 68 (along with the axle 60) function as an axle assembly of the hub motor arrangement 40 about which the housing 42 rotates. Thus, the first lateral support member 62 and/or the second lateral support member 68, along with the connecting shafts 74, can be considered as a stationary carrier for the planet gears 86. Therefore, in the illustrated arrangement, the planet gears 86 rotate about the connecting shafts 74, but otherwise do not rotate as a unit (with the first lateral support member 62, connecting shafts 74 and the second lateral support member 68) relative to the motor 44. Rather, the rotation of the planet gears 86 drives or causes rotation of the ring gear 88, which, in turn, drives the housing 42.

As described with respect to FIGS. 1-6. one or more of the hub motor arrangements 40 can be used to provide driving power to an associated vehicle. The hub motor arrangement 40 can be driven in a forward direction only, or can have both forward and reverse operations by changing the rotational direction of the motor 44. One-way bearings or clutch mechanisms can be employed to allow driving force in one direction (e.g., forward), while permitting the housing 42 to rotate faster than it is being driven by the motor 44 (over speed) and/or to permit the housing 42 to be free-wheeled in a second direction (e.g., reverse). Alternatively, the hub motor arrangement 40 can be configured for forward operation only, with reverse motion requiring the resistance of the motor 44 to be overcome.

As described previously, the planetary gear arrangement 82 can provide any desired overall gear ratio to convert the torque or power provided by the motor 44 into suitable torque or power for driving the housing 42 and, thus, the traction element 48 depending on the desired operational speed of the hub motor arrangement 40 and associated vehicle. In the illustrated arrangement, the sun gear 84 is many times smaller (in diameter and/or number of gear teeth) than the first portions 86*a* of the planet gears 86. The second portions 86*b* of the planet gears 86 are many times smaller (in diameter and/or number of gear teeth) than the first portions 86*a* of the planet gears 86. In some configurations, the transmission 46 can have an overall ratio of between about 1:20 to about 1:40 or any value or sub-range of values within this range, such as about 1:30, for example and without limitation.

Figure 15:
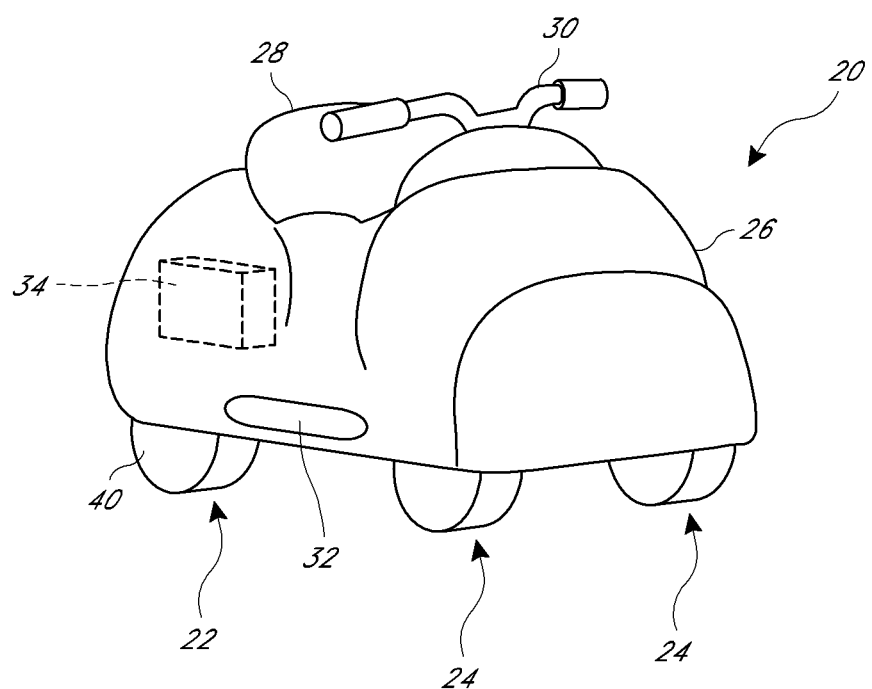
FIG. 15 is a vehicle, such as a child's ride-on vehicle, that incorporates one or more hub motor arrangements having certain features, aspects and advantages of a preferred embodiment.

FIG. 15 illustrates a vehicle, such as a child's ride-on vehicle 20 or other light weight vehicle, which incorporates one or more drive wheels 22 each of which provides a drive torque that rotates the wheel 22 to propel the vehicle 20. Preferably, each drive wheel 22 incorporates a hub motor arrangement 40. Although a child-sized vehicle 20 is shown and described herein, the hub motor arrangement 40 can be incorporated in other types of vehicles, as well. Furthermore, any suitable number of hub motor arrangements 40 or drive wheels 22 can be used, including a single wheel or all of the vehicle wheels. If less than all of the wheels are drive wheels 22, the remaining wheels can be non-drive wheels 24. Such non-drive wheels 24 can be of any suitable arrangement, such as fixed direction wheels, steerable wheels or casters, for example.

Preferably, the vehicle 20 includes a body 26 that is supported by the wheels 22 and/or 24. In the illustrated arrangement, four wheels 22, 24 are provided at each corner of the vehicle body 26 (only three are visible); however, the vehicle 20 could have other numbers and/or arrangements of wheels, including one, two, three or more than four wheels. The illustrated vehicle 20 includes a seat 28 for a rider of the vehicle 20 and a steering arrangement 30, such as a steering wheel or handlebar, which permits a user to steer one or more of the wheels 22, 24. The vehicle 20 may also include footrests 32 or another arrangement for a user to place his or her feet.

The vehicle 20 preferably also includes a source of power, such as a battery 34, to provide electric power to the hub motor arrangement(s) 40 via a suitable wired or wireless connection. The vehicle 20 preferably also includes a throttle or speed controller (not shown), such as a foot pedal or hand grip twist throttle, that is accessible to the user and allows the user to modulate the drive torque produced by the hub motor arrangement(s) 40. A control arrangement or controller (not shown) can be provided to receive signals from the throttle or speed controller, process such signals and provide control signals to the hub motor arrangement(s) 40. A suitable brake arrangement preferably is also provided that is configured to provide a braking force to one or more of the wheels 22, 24. Such a brake arrangement could include regenerative braking that charges the battery 34 during braking, if desired. Other non-regenerative braking arrangements could be provided in addition or in the alternative.

Figure 16:
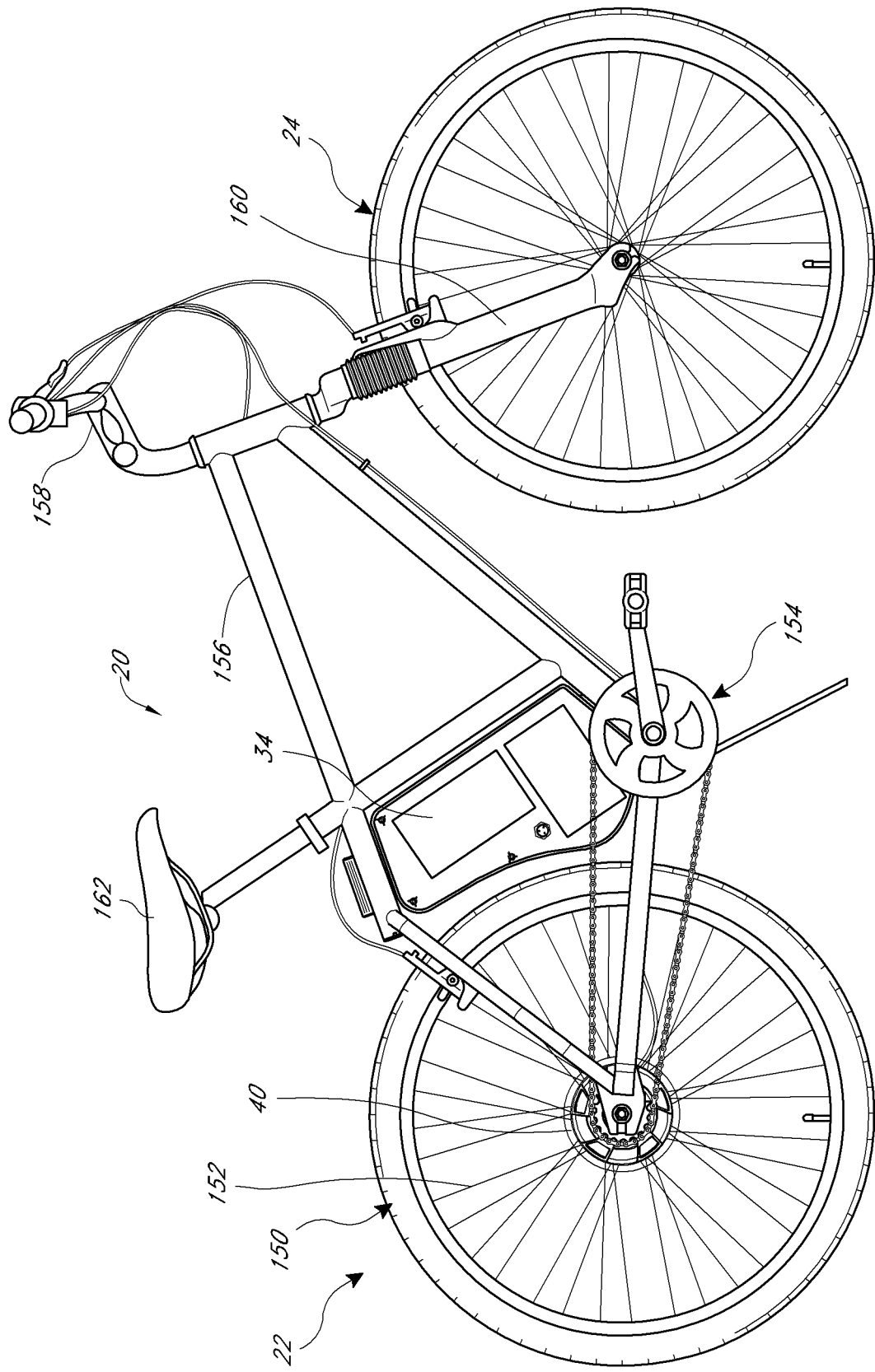
FIG. 16 is a bicycle that incorporates one or more hub motor arrangements having certain features, aspects and advantages of a preferred embodiment.

FIG. 16 illustrates a vehicle, such as a bicycle 20, which incorporates one or more drive wheels 22 each of which provides a drive torque that rotates the wheel 22 to propel the vehicle 20. In the illustrated arrangement, the rear wheel is a drive wheel 22 that incorporates a hub motor arrangement 40 coupled to a rim and tire assembly 150 by a plurality of spokes 152. However, in addition or in the alternative, a hub motor arrangement can be used with the front, steerable wheel. As in the other vehicles disclosed herein, the bicycle 20 includes a battery 34 electrically coupled to the hub motor arrangement(s) 40 and preferably includes a controller and brake system. The bicycle 20 preferably includes some or all of the normal components of a conventional bicycle, such as a pedal crank drive arrangement 154 (e.g., chain or belt connecting drive and driven gears or sprockets), a main frame 156, handlebar 158, front fork 160 and seat or saddle 162.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. In addition, any of the hub motor arrangements disclosed herein can be utilized with any of the vehicles disclosed herein, or can be utilized in any other suitable application. It is therefore intended that such changes and modifications be included within the scope of the invention. Moreover, not all of the features, aspects and advantages are necessarily required to practice the present invention. Accordingly, the scope of the present invention is intended to be defined only by the claims that follow.

What is claimed is:

1. A hub motor arrangement, comprising:
  a housing defining an interior space;
  a first interconnecting member positioned within the interior space of the housing;
  a second interconnecting member positioned within the interior space of the housing and configured to engage the first interconnecting member;
  a first lateral support member and a second lateral support member spaced from the first lateral support member along an axis of rotation;
  a plurality of planet gears positioned between the first and second interconnecting members;
  a ring gear driven by the plurality of planet gears; and
  a motor coupled for rotation with the ring gear and the housing;
  wherein the first and second interconnecting members engage one another in a space that is located between the plurality of planet gears in a circumferential direction.

2. The hub motor arrangement of claim 1, further comprising an axle defining the axis of rotation, wherein a first end portion of the axle is located outside of the interior space of the housing and a second end portion of the axle is located within the interior space of the housing such that the axle does not pass completely through the housing.

3. The hub motor arrangement of claim 2, wherein the housing is supported for rotation relative to the axle by a bearing.

4. The hub motor arrangement of claim 2, wherein the plurality of planet gears are positioned between the axle and the motor along the axis of rotation.

5. The hub motor arrangement of claim 2, wherein a length of the axle is greater than a width of the first interconnecting member.

6. The hub motor arrangement of claim 1, wherein the ring gear is a separate component from the housing.

7. The hub motor arrangement of claim 1, wherein the ring gear is integrated with the housing.

8. The hub motor arrangement of claim 1, further comprising a traction element that contacts a surface on which a vehicle is operated, wherein the traction element is carried indirectly by the housing.

9. The hub motor arrangement of claim 1, wherein the housing comprises the axis of rotation and a central plane that is perpendicular to the axis of rotation, wherein the motor is offset from the central plane along the axis of rotation.

10. The hub motor arrangement of claim 1, further comprising a connecting shaft, wherein the connecting shaft extends from one of the first or the second lateral support member.

11. The hub motor arrangement of claim 1, wherein each of the plurality of planet gears is a double spur gear.

12. A hub motor arrangement, comprising:
  a housing defining an interior space;
  a motor having a first end and a second end;
  a first interconnecting member and a second interconnecting member positioned within the interior space of the housing, the second interconnecting member configured to engage the first interconnecting member;
  a plurality of planet gears positioned between the first and second interconnecting members;
  a ring gear driven by the plurality of planet gears; and
  a connecting shaft configured to provide lateral support to the housing, wherein an end of the connecting shaft extends laterally beyond a first end of the motor towards the second end of the motor.

13. The hub motor arrangement of claim 12, further comprising an axle defining an axis of rotation of the housing, wherein a first end portion of the axle is located outside of the interior space of the housing and a second end portion of the axle is located within the interior space of the housing such that the axle does not pass completely through the housing.

14. The hub motor arrangement of claim 13, wherein the housing is supported for rotation relative to the axle by a bearing.

15. The hub motor arrangement of claim 13, wherein the plurality of planet gears are positioned between the axle and the motor along the axis of rotation.

16. The hub motor arrangement of claim 13, wherein a length of the axle is greater than a width of the first interconnecting member.

17. The hub motor arrangement of claim 12, wherein the housing comprises an axis of rotation and a central plane that is perpendicular to the axis of rotation, wherein the motor is offset from the central plane along the axis of rotation.

18. The hub motor arrangement of claim 12, further comprising a first lateral support member and a second lateral support member spaced from the first lateral support member along an axis of rotation.

19. The hub motor arrangement of claim 18, wherein the connecting shaft extends from one of the first or the second lateral support member.

20. A hub motor arrangement, comprising:
a housing defining an interior space;
a first interconnecting member positioned within the interior space of the housing;
a second interconnecting member positioned within the interior space of the housing and configured to engage the first interconnecting member;
a plurality of planet gears positioned between the first and second interconnecting members, wherein each of the plurality of planet gears is a double spur gear;
a ring gear driven by the plurality of planet gears; and
a motor coupled for rotation with the ring gear and the housing;
wherein the first and second interconnecting members engage one another in a space that is located between the plurality of planet gears in a circumferential direction.

21. The hub motor arrangement of claim 20, further comprising an axle defining an axis of rotation of the housing, wherein a first end portion of the axle is located outside of the interior space of the housing and a second end portion of the axle is located within the interior space of the housing such that the axle does not pass completely through the housing.

22. The hub motor arrangement of claim 20, wherein the ring gear is a separate component from the housing.

23. The hub motor arrangement of claim 20, wherein the ring gear is integrated with the housing.

24. The hub motor arrangement of claim 20, further comprising a traction element that contacts a surface on which a vehicle is operated, wherein the traction element is carried indirectly by the housing.

25. The hub motor arrangement of claim 20, wherein the housing comprises an axis of rotation and a central plane that is perpendicular to the axis of rotation, wherein the motor is offset from the central plane along the axis of rotation.

* * * * *